United States Patent
Suzuki et al.

(10) Patent No.: US 9,098,414 B2
(45) Date of Patent: Aug. 4, 2015

(54) MULTI-CORE PROCESSOR SYSTEM, COMPUTER PRODUCT, AND CONTROL METHOD

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 13/720,023

(22) Filed: Dec. 19, 2012

(65) Prior Publication Data

US 2013/0111138 A1    May 2, 2013

Related U.S. Application Data

(63) Continuation of application No. PCT/JP2010/060911, filed on Jun. 25, 2010.

(51) Int. Cl.
  G06F 12/00    (2006.01)
  G06F 12/08    (2006.01)

(52) U.S. Cl.
  CPC .......... *G06F 12/0811* (2013.01); *G06F 12/084* (2013.01)

(58) Field of Classification Search
  CPC ..................... G06F 12/0811; G06F 12/084
  USPC .................................................. 711/122, 130
  See application file for complete search history.

(56) References Cited

U.S. PATENT DOCUMENTS

| 5,293,602 | A | 3/1994 | Fukagawa et al. |
| 6,253,290 | B1 | 6/2001 | Nakamoto |
| 6,434,672 | B1 * | 8/2002 | Gaither .......................... 711/130 |
| 6,901,450 | B1 | 5/2005 | Shimada |

(Continued)

FOREIGN PATENT DOCUMENTS

| JP | 3-25541 | 2/1991 |
| JP | 3-228169 | 10/1991 |

(Continued)

OTHER PUBLICATIONS

Japanese Office Action issued Aug. 27, 2013 in corresponding Japanese Application No. 2012-521253.

(Continued)

*Primary Examiner* — Aracelis Ruiz
(74) *Attorney, Agent, or Firm* — Staas & Halsey LLP

(57) ABSTRACT

A multi-core processor system includes shared memory shared by cores of a multi-core processor; first cache memories respectively for each of the cores; a second cache memory between the shared memory and the first cache memories, and storing shared data shared by the cores and referred to by at least threads executed by the multi-core processor; a reading unit that reads a value of a given variable from the shared memory; a determining unit that based on a read request for the given variable, determines whether the given variable is shared data or non-shared data that is referred to by only one thread; and a transferring unit that, when the given variable is determined as non-shared data, transfers without using the second cache memory, the value of the given variable to a first cache memory of a core that is a request origin of the read request.

3 Claims, 31 Drawing Sheets

(56) References Cited

U.S. PATENT DOCUMENTS

| | | |
|---|---|---|
| 2008/0104329 A1 | 5/2008 | Gaither et al. |
| 2012/0320071 A1 | 12/2012 | Munshi et al. |

FOREIGN PATENT DOCUMENTS

| | | |
|---|---|---|
| JP | 4-353948 | 12/1992 |
| JP | 5-274222 | 10/1993 |
| JP | 9-288616 | 11/1997 |
| JP | 2000-82049 | 3/2000 |
| JP | 2002-140232 | 5/2002 |
| JP | 2004-30362 | 1/2004 |
| JP | 2008-117388 | 5/2008 |
| JP | 2008-204488 | 9/2008 |
| WO | WO 2009/148713 A1 | 12/2009 |

OTHER PUBLICATIONS

International Search Report of PCT/JP2010/060911 mailed Feb. 8, 2011.

Japanese International Preliminary Report on Patentability mailed Jan. 24, 2013, issued in corresponding PCT Patent Application No. PCT/JP2010/060911.

\* cited by examiner

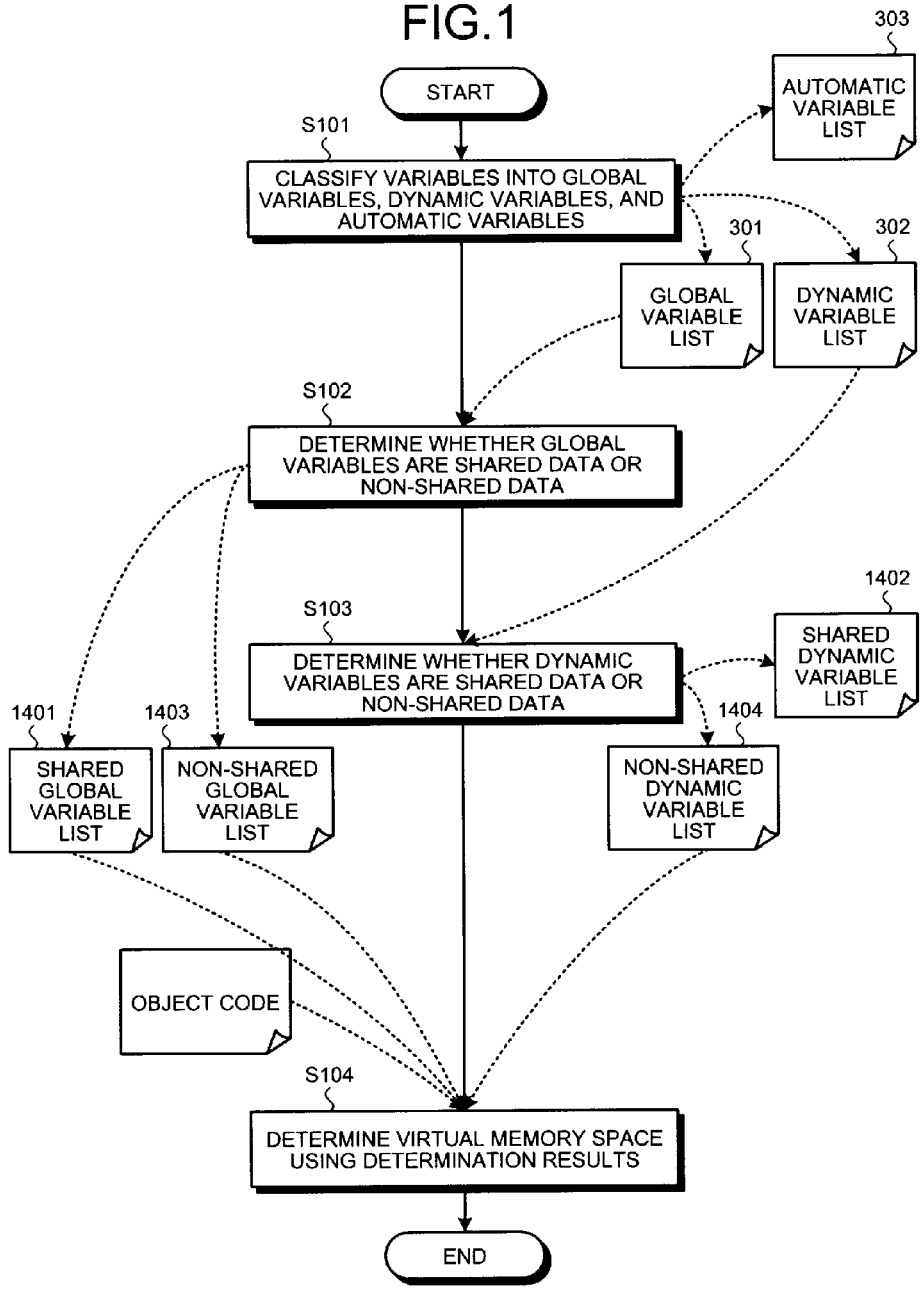

FIG.2    200

```
...
int g1,g2,g3;  ⇐====  GLOBAL VARIABLE int main(int argc, char *argv[]) {
  int* s1, s2, l1,l2;
  int** args;
  s1 = (int*)malloc(sizeof(int));  ⇐====  DYNAMIC VARIABLE
  s2 = &g1;
  l2 = &g2;
  l1 = (int*)malloc(sizeof(int));  ⇐====  DYNAMIC VARIABLE
  args = (int**)malloc(sizeof(int*)*2); ⇐== DYNAMIC VARIABLE
  args[0] = s2;
  g1 = 10;
  g2 = 5;
  g3 = 7;
  ...
  thread_create(&thread, NULL, &th1, s1);
  thread_create(&thread, NULL, &th2, args);
  ...
} void th1(void* s) {
  ...
  *s = g3;
  ...
} void th2(void* args) {
  int* s = (int**)args[0];
  int l, m;
  ...
  *s = 20;
  args[1] = (int*)malloc(sizeof(int));
  l = g3;
  ...
  m=l
}
```

FIG.3

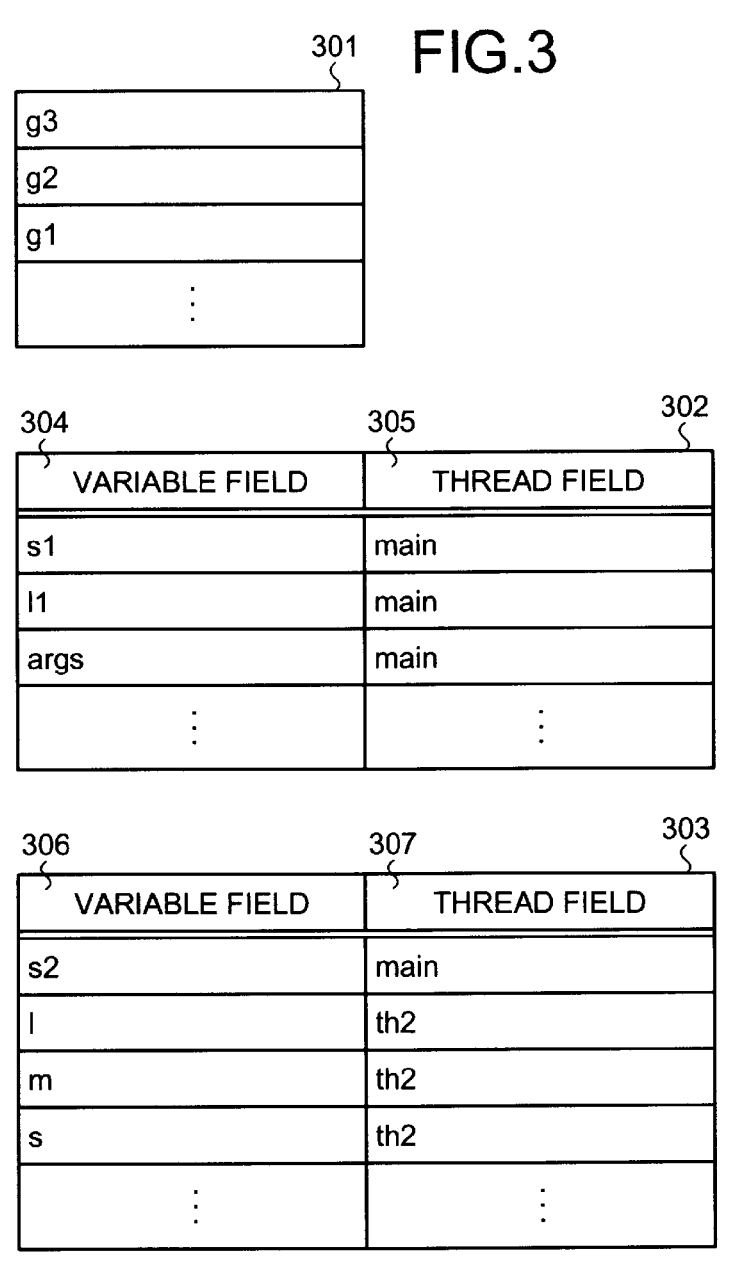

| 301 |
|---|
| g3 |
| g2 |
| g1 |
| ⋮ |

| VARIABLE FIELD (304) | THREAD FIELD (305) | 302 |
|---|---|---|
| s1 | main |
| l1 | main |
| args | main |
| ⋮ | ⋮ |

| VARIABLE FIELD (306) | THREAD FIELD (307) | 303 |
|---|---|---|
| s2 | main |
| l | th2 |
| m | th2 |
| s | th2 |
| ⋮ | ⋮ |

```
...
int g1,g2,g3;         (1-1)
                      SELECTION
int main(int argc, char *argv[]) {
  int* s1, s2, l1,l2;
  int** args;
  s1 = (int*)malloc(sizeof(int));
  s2 = &g1;
  l2 = &g2;
  l1 = (int*)malloc(sizeof(int));
  args = (int**)malloc(sizeof(int*)*2);
  args[0] = s2;
  g1 = 10;
  g2 = 5;
  g3 = 7;
  ...
  thread_create(&thread, NULL, &th1, s1);
  thread_create(&thread, NULL, &th2, args);
  ...
} void th1(void* s) {
  *s = g3;            (1-2) REFERRED TO BY
                            ANOTHER THREAD
  ...
} void th2(void* args) {
  int* s = (int**)args[0];
  int l, m;
  ...
  *s = 20;
  args[1] = (int*)malloc(sizeof(int));
  l = g3;
                      (1-2) REFERRED TO BY
  ...                        ANOTHER THREAD
  m=l
}
```

FIG.10    200

```
...
int g1,g2,p3;        (1-1)
                    SELECTION
int main(int argc, char *argv[]) {
  int* s1, s2, l1,l2;
  int** args;
  s1 = (int*)malloc(sizeof(int));
  s2 = &g1;                        (1-3) SUBSTITUTE FOR
  l2 = &g2;                         ANOTHER VARIABLE
  l1 = (int*)malloc(sizeof(int));
  args = (int**)malloc(sizeof(int*)*2);
  args[0] = s2;
  g1 = 10;
  g2 = 5;
  g3 = 7;
  ...
  thread_create(&thread, NULL, &th1, s1);
  thread_create(&thread, NULL, &th2, args);
  ...
} void th1(void* s) {
  ...
  *s = g3;
  ...
} void th2(void* args) {
  int* s = (int**)args[0];
  int l, m;
  ...
  *s = 20;
  args[1] = (int*)malloc(sizeof(int));
  l = g3;
  ...
  m=l
}
```

FIG.12      200

```
...
int g1,g2,g3;

int main(int argc, char *argv[]) {
  int* s1, s2, l1,l2;
  int** args;
  s1 = (int*)malloc(sizeof(int));
  s2 = &g1;
  l2 = &g2;                                    (2-1)
  l1 = (int*)malloc(sizeof(int));              SELECTION
  args = (int**)malloc(sizeof(int*)*2);
  args[0] = s2;
  g1 = 10;
  g2 = 5;
  g3 = 7;
  ...
  thread_create(&thread, NULL, &th1, s1);
  thread_create(&thread, NULL, &th2, args);
  ...
} void th1(void* s) {
  ...
  *s = g3;
  ...
} void th2(void* args) {
  int* s = (int**)args[0];
  int l, m;
  ...
  *s = 20;
  args[1] = (int*)malloc(sizeof(int));
  l = g3;
  ...
  m=l
}
```

FIG.13

```
...
int g1,g2,g3;

int main(int argc, char *argv[]) {
  int* s1, s2, l1,l2;
  int** args;
  s1 = (int*)malloc(sizeof(int));          (2-1)
  s2 = &g1;                                SELECTION
  l2 = &g2;
  l1 = (int*)malloc(sizeof(int));
  args = (int**)malloc(sizeof(int*)*2);
  args[0] = s2;                   (2-2) VARIABLE TO BE
  g1 = 10;                        DELIVERED TO CHILD
  g2 = 5;                               THREAD
  g3 = 7;

thread_create(&thread, NULL, &th1, s1);
  thread_create(&thread, NULL, &th2, args);
  ...
} void th1(void* s) {
  ...
  *s = g3;
  ...
} void th2(void* args) {
  int* s = (int**)args[0];
  int l, m;
  ...
  *s = 20;
  args[1] = (int*)malloc(sizeof(int));
  l = g3;
  ...
  m=l
}
```

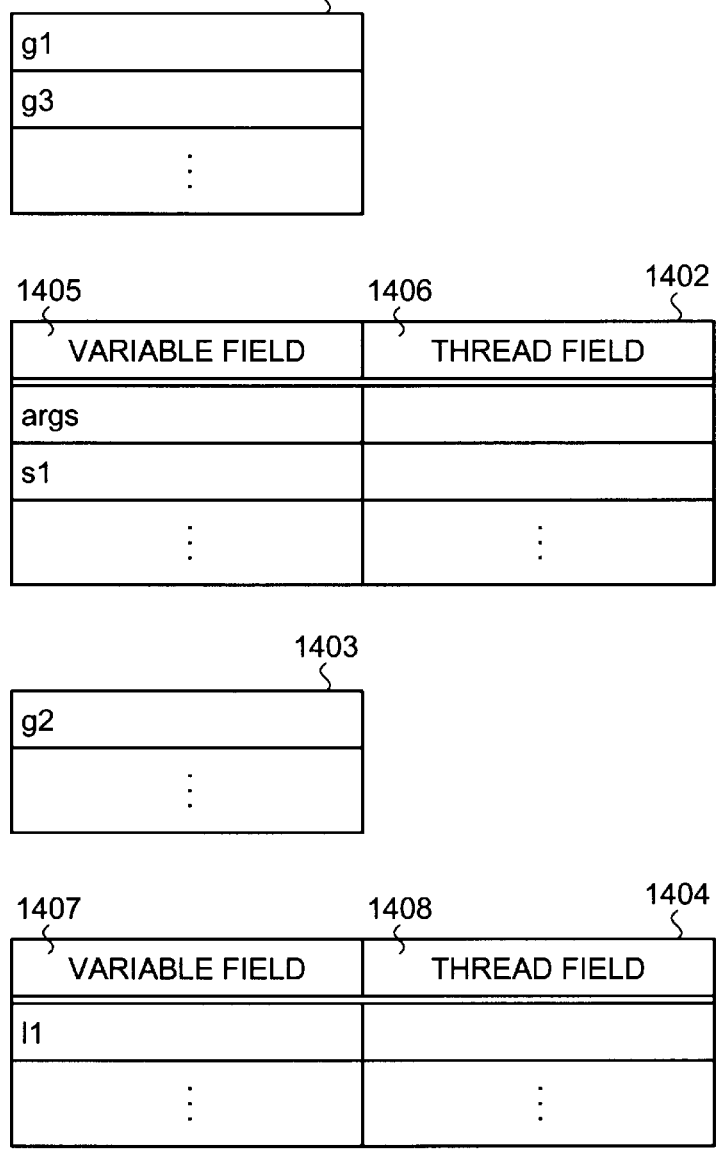

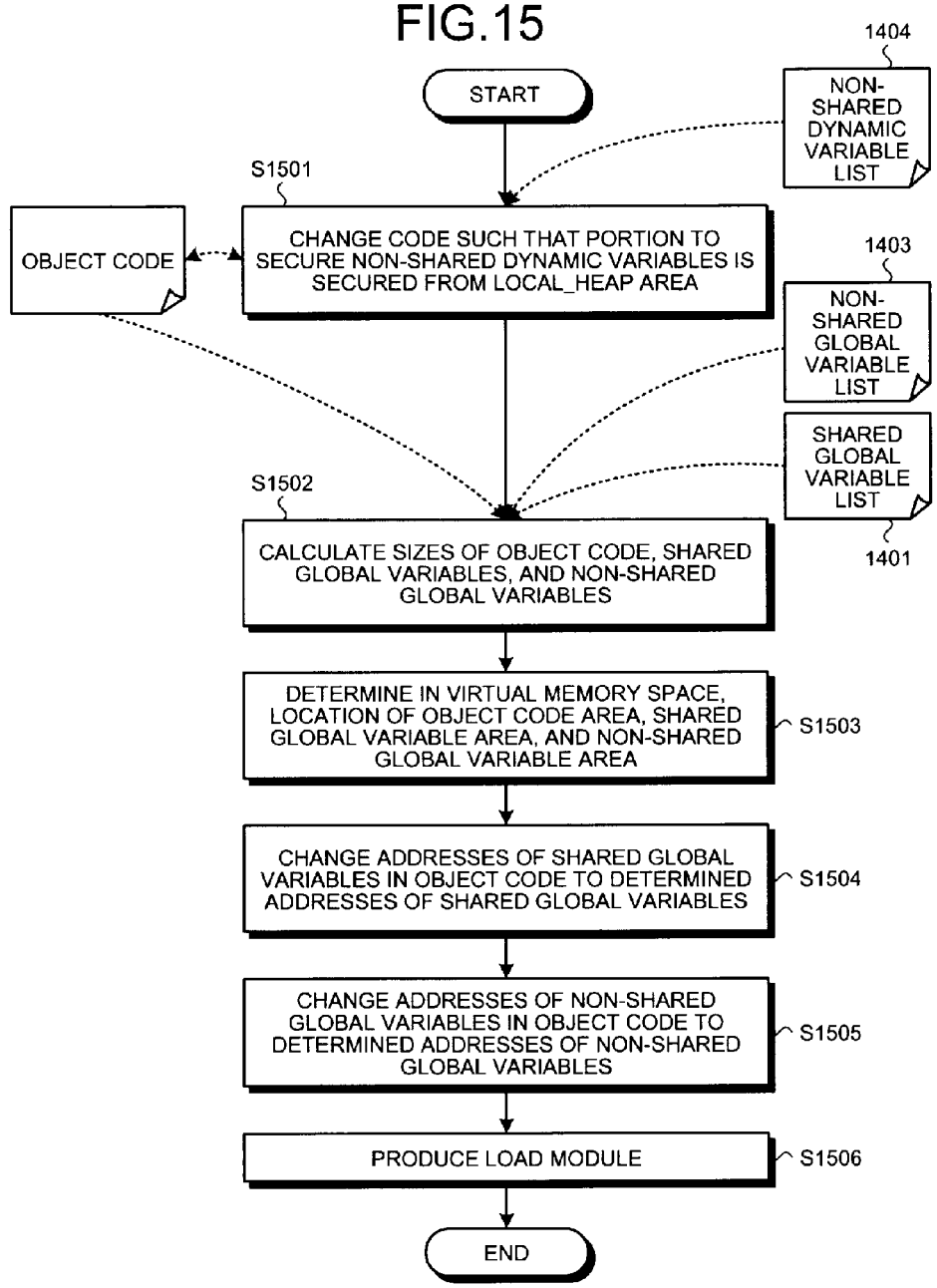

FIG.20

| TAG INFORMATION (ADDRESS INFORMATION+AREA INFORMATION) | DATA |
|---|---|
| TAG INFORMATION (ADDRESS INFORMATION+AREA INFORMATION) | DATA |
| ⋮ | ⋮ |
| TAG INFORMATION (ADDRESS INFORMATION+AREA INFORMATION) | DATA |

1841

| 2301 | 2302 | 2303 | 2300 |
|---|---|---|---|
| LOGICAL ADDRESS FIELD | PHYSICAL ADDRESS FIELD | AREA ATTRIBUTE FIELD | |
| ... | ... | ... | |
| ... | ... | ... | |
| ... | ... | ... | |

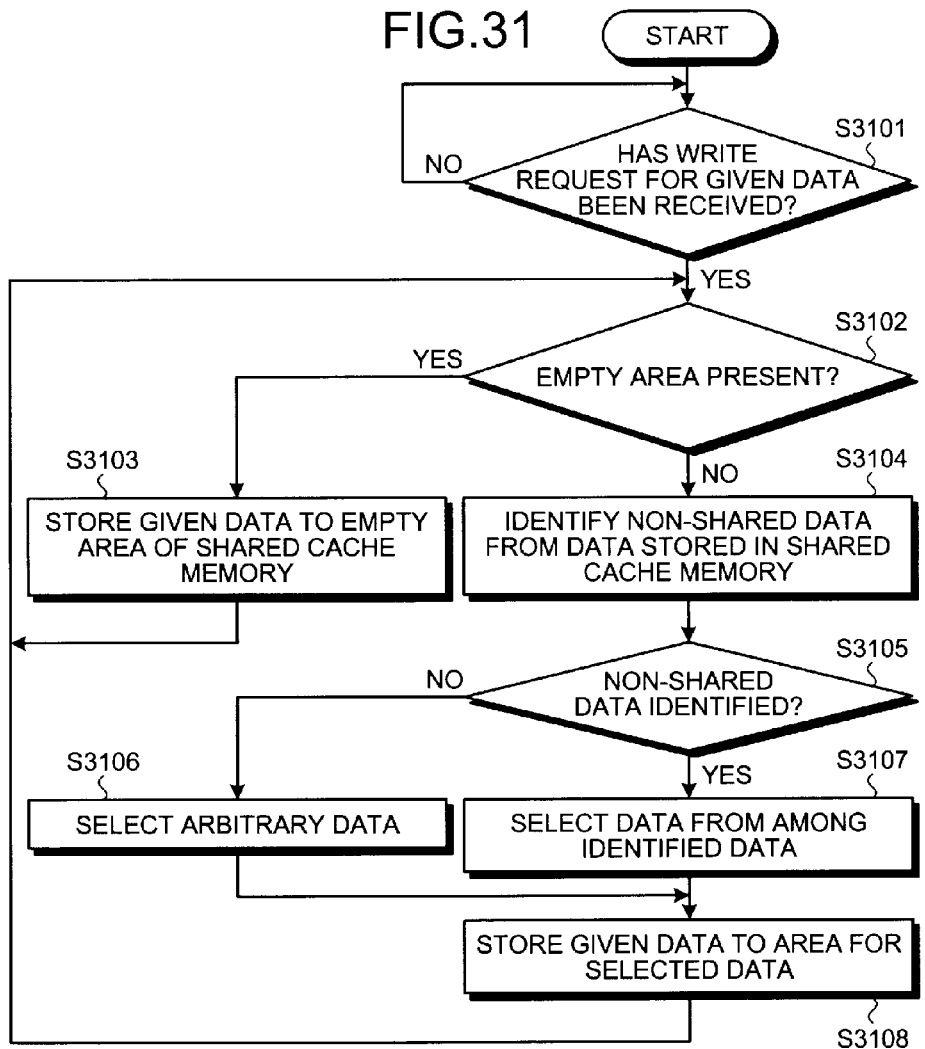

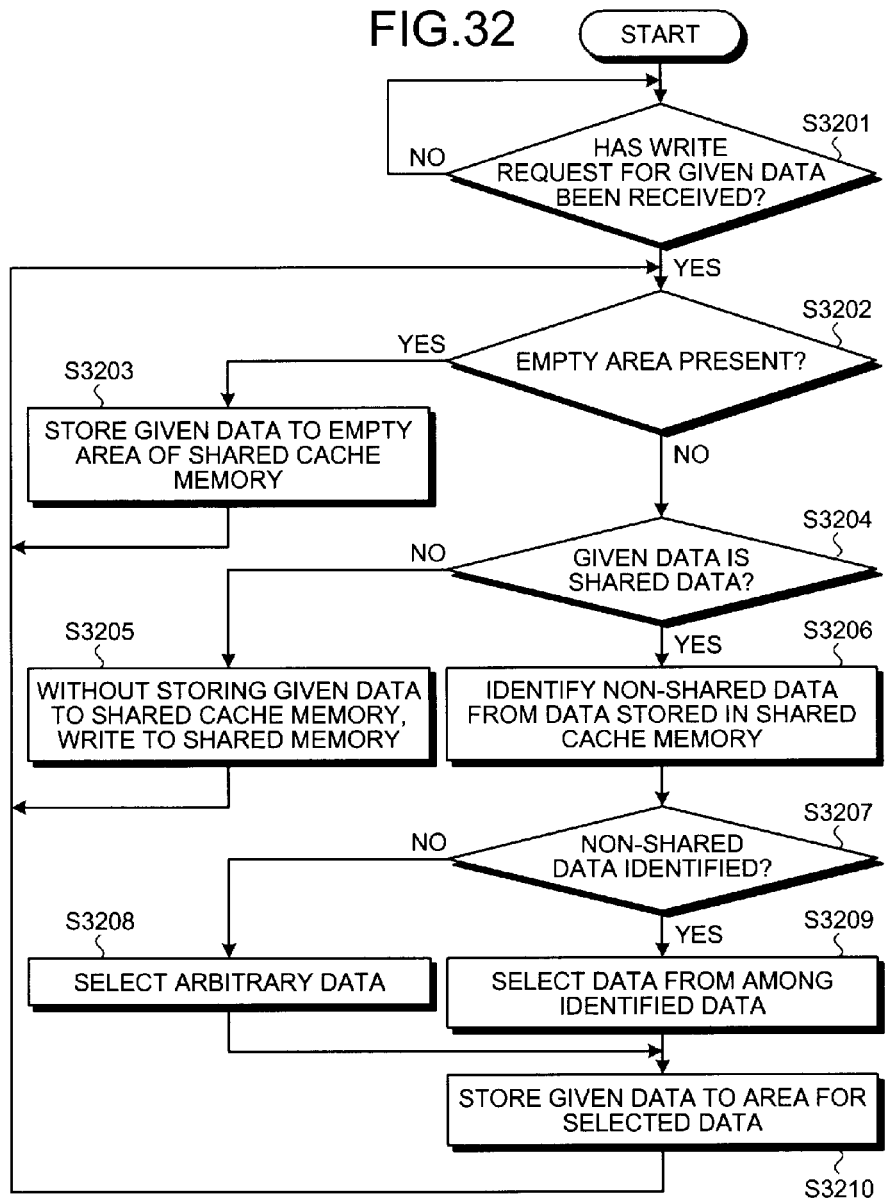

MULTI-CORE PROCESSOR SYSTEM, COMPUTER PRODUCT, AND CONTROL METHOD

CROSS REFERENCE TO RELATED APPLICATIONS

This application is a continuation application of International Application PCT/JP2010/060911, filed on Jun. 25, 2010 and designating the U.S., the entire contents of which are incorporated herein by reference.

FIELD

The embodiments discussed herein are related to a multi-core processor system, a computer product, and a control method that control access to memory.

BACKGROUND

In a conventional shared-memory multi-core processor system, each central processing unit (CPU) of the multi-core processor has therein high-speed small-capacity distributed cache memory. A hierarchical cache is known that is formed by disposing intermediate-speed intermediate-capacity shared caches in one or more hierarchies between the distributed cache and the shared memory. It is assumed that the distributed cache is closest to the CPU and that the closer a cache is to the CPU, the higher the cache is in the hierarchy.

The hierarchical cache is designed such that an intermediate-hierarchy cache has a lower access speed than that of a higher-hierarchy cache and has a larger capacity than that of the higher-hierarchy cache, and has a higher access speed than that of an lower-hierarchy cache and has a smaller capacity than that of the lower-hierarchy cache.

In the hierarchical cache, when data to be read is not stored in a higher-hierarchy cache, the data is read from a lower-hierarchy cache and is simultaneously stored in the higher-hierarchy cache. When the data to be read is also not stored in the lower-hierarchy cache, the reading is tried of the data from a cache in a further lower hierarchy. It is known that, when the data to be read is not stored even in the lowest-hierarchy cache, an operation is executed to read the data from the shared memory.

In the case where data is newly stored in a cache, when the cache memories are already full, the data to be removed is determined by a cache controller employing a least recently used (LRU) scheme, etc. The data determined to be removed is written back into the shared memory for a single-hierarchy cache. However, the removed data is stored in a cache whose hierarchy is lower by one hierarchy, in a multi-hierarchy cache. The new data is stored in an area that is cleared by the removal operation. Thereby, in the multi-hierarchy cache, even when the capacity of a higher-hierarchy cache is full, while the removed data remains in a lower-hierarchy cache, the data is accessible at a higher speed than that for the shared memory.

A technique is known according to which a CPU directly accesses shared memory to increase the speed of reading data when traffic is high consequent to access of a cache memory (see, e.g., Japanese Laid-Open Patent Publication No. 2008-117388).

When the shared cache is present in a hierarchy that is lower than the distributed cache, the shared cache is designed to have a capacity that is larger than the total capacity of the distributed caches in hierarchies that are higher than the shared cache such that the data overflowing from each of the distributed caches can be stored. Plural CPUs simultaneously execute processing in the multi-core processor system and therefore, data overflowing and removed from each of the distributed caches enters the shared cache and competition to acquire the shared cache occurs. For example, when one CPU executes a process using a large amount of data, a lower shared cache memory is filled with the data overflowing from the distributed cache memory of the CPU. Therefore, any other CPU can substantially not use the lower shared cache memory.

When a large-sized apparatus or a general-purpose apparatus has a large shared cache memory, the shared cache memory can store therein a large amount of data. However, an embedded multi-core processor system provided in a portable apparatus has a shared cache memory that is about several to several ten times as small as that of a large-sized apparatus or the general purpose apparatus. Therefore, in the embedded multi-core processor, even for an ordinary process using a small amount of data, plural CPUs simultaneously execute a thread. Therefore, a problem arises in that competition occurs to acquire the area of the shared cache memory.

SUMMARY

According to an aspect of an embodiment, a multi-core processor system includes a shared memory that is shared by cores of a multi-core processor; first cache memories that are for each of the cores, respectively; a second cache memory that is between the shared memory and the first cache memories, and stores shared data that is shared by the cores and referred to by at least a plurality of threads executed by the multi-core processor; a reading unit that reads a value of a given variable from the shared memory; a determining unit that based on a read request for the given variable, determines whether the given variable is shared data or non-shared data that is referred to by only one thread; and a transferring unit that, when the determining unit determines that the given variable is non-shared data, transfers without using the second cache memory, the value of the given variable read by the reading unit to a first cache memory of a core that is a request origin of the read request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a flowchart of an example of the overall processing at the time of design;

FIG. 2 is an explanatory diagram of an example of a given program to be executed;

FIG. 3 is an explanatory diagram of an example of variable lists;

FIG. 9 is an explanatory diagram of a first example of determination of a global variable;

FIG. 10 is an explanatory diagram of a second example of determination of the global variable;

FIG. 12 is an explanatory diagram of a first example of determination of a dynamic variable;

FIG. 13 is an explanatory diagram of a second example of determination of the dynamic variable;

FIG. 14 is an explanatory diagram of an example of a determination result;

FIG. 15 is a flowchart of a load module generation process procedure executed by the design support apparatus;

FIG. 20 is an explanatory diagram of an example of a distributed cache memory 1841;

FIG. 31 is a flowchart of a first example of a control process procedure executed by the shared cache controller 1834 according to the third embodiment; and FIG. 32 is a flowchart of a second example of the control process procedure executed by the shared cache controller 1834 according to the third embodiment.

DESCRIPTION OF EMBODIMENTS

Figure 4:
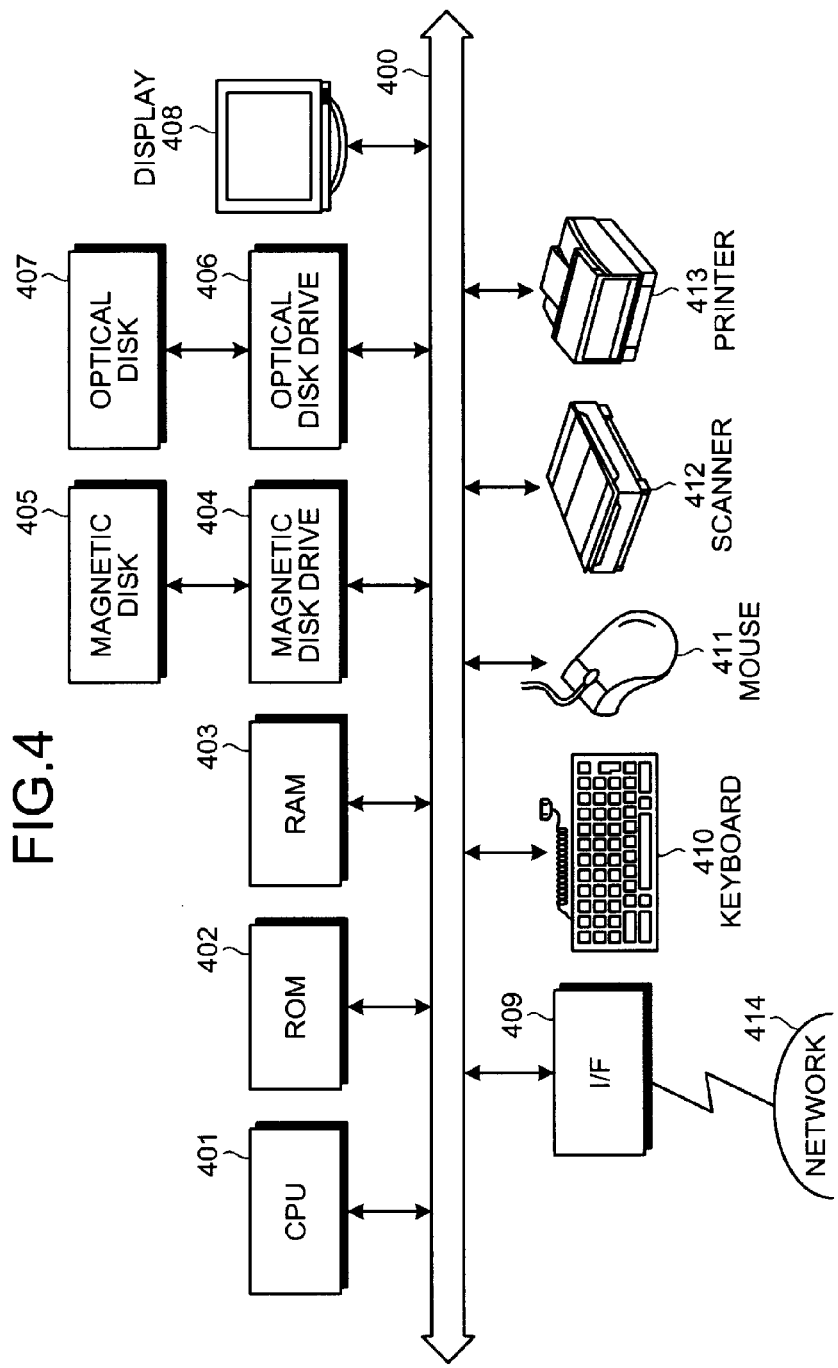
FIG. 4 is a block diagram of a hardware configuration of a design support apparatus according to embodiments.

Preferred embodiments of the present invention will be explained with reference to the accompanying drawings.

"Shared data" and "non-shared data" will first be described. The "shared data" is data that is shared among threads, that is, data referred to by plural threads. The "non-shared data" is data that is not shared among the threads, that is, data referred to by only one thread. The "thread" is a function designated by a thread description defined by an OS or a function group invoked by program code and the function.

The non-shared data is not used by another CPU during execution of one thread, and is not used again when the execution of the one thread comes to an end. The shared data may not only be used by another CPU during execution of one thread but also be referred to by another thread executed by the same CPU or another thread executed by another CPU after the execution of the one thread comes to an end. Therefore, the shared data is the data that had better be retained in the cache for a long time even after the execution of the one thread comes to an end.

In a first embodiment, an example will be described where it is automatically determined at the time of design whether each variable in a program to be executed is shared data or non-shared data, and a load module is generated based on determination results.

In a second embodiment and a third embodiment, each memory management unit (MMU) manages information indicating whether the variable is shared data or non-shared data, based on the load module generated in the first embodiment in a multi-core processor system. In the second embodiment, an example will be described where the non-shared data is not stored in a shared cache memory but is stored in a distributed cache memory of a CPU that uses the non-shared data.

In the third embodiment, an example will be described where, when removal of data from the shared cache memory occurs in the multi-core processor system and when the non-shared data and the shared data are stored in the shared cache memory, the non-shared data is removed first, that is, the shared data is preferentially retained in the shared cache memory.

In the first embodiment, the example where it is automatically determined at the time of design whether each variable in a program to be executed is shared data or non-shared data, and a load module is generated based on determination results will be described.

FIG. 1 is a flowchart of an example of the overall processing at the time of design. A design support apparatus classifies into global variables, dynamic variables, and automatic variables, variables in the program to be executed (step S101). The classification results in a global variable list 301, a dynamic variable list 302, and an automatic variable list 303. The design support apparatus determines whether each of the global variables is shared data or non-shared data (step S102), and also determines whether each of the dynamic variables is shared data or non-shared data (step S103). The determination results in a shared global variable list 1401, a non-shared global variable list 1403, a shared dynamic variable list 1402, and a non-shared dynamic variable list 1404. Object code is code of the program to be executed.

The design support apparatus determines virtual memory space using the determination results (step S104). The processing executed by the design support apparatus may be realized using a compiler.

The variables in the program to be executed can be classified roughly into the three kinds of variables that are the global variables, the automatic variables, and the dynamic variables. Taking an example of C language, the global variables, the automatic variables, and the dynamic variables thereof are as follows.

Global Variable: A variable declared outside a function defining portion.

Automatic Variable: A variable declared in the function defining portion.

Dynamic Variable: A variable secured by a partitioning function such as a malloc function.

The global variable and the dynamic variable can each be used in plural threads. Therefore, the variables classified into global variables and dynamic variables include shared data and non-shared data that are mixed with each other. The manner of sharing among threads differs between the global variable and the dynamic variable and therefore, in the first embodiment, it is determined whether a global variable and a dynamic variable in different flows, respectively, are shared among threads.

The dynamic variable is not present on the program code and an area for the dynamic variable is secured by a determined function such as a malloc function. For the dynamic variable, the head address of a secured area, returned as a result of the malloc function, etc., is stored in another variable and the dynamic variable is used through the other variable. Therefore, in this case, a variable that is secured by the function determined such as the malloc function, etc. and that is substituted first is recorded as the dynamic variable and this record is used as a starting point of a flow to determine whether the dynamic variable is shared among threads. The malloc function is commonly known and will not be described in detail.

The automatic variables are the variables remaining after excluding the variables identified as the dynamic variables from the variables declared in the function defining portion. Sharing of any automatic variables among threads is prohibited in any multi-thread program based on the C language and therefore, an automatic variable can not be used by another thread. Therefore, all the automatic variables are non-shared data.

A design engineer of the program to be executed can classify the variables in the program into global variables, dynamic variables, and automatic variables using a compiler and therefore, the details of the classification method will not be described herein.

FIG. 2 is an explanatory diagram of an example of a given program to be executed. A program 200 to be executed has three threads described therein, including threads "main", "th1", and "th2". The threads th1 and th2 are invoked by the thread "main". Therefore, the thread "main" is a parent thread of the threads th1 and th2, and the threads th1 and th2 are child threads of the thread "main".

Variables g1, g2, and g3 are declared outside the threads and therefore, the variables g1, g2, and g3 are global variables. In the thread "main", variables s1, s2, I1, I2, and "args" are declared. In the description herein, even a pointer-type variable is referred to as "variable" for simplification. The dynamic variables are secured by the malloc function in the thread "main". The variable s1, I1, and "args" store therein the dynamic variables secured by the malloc function. Therefore, among the variables declared in the thread "main", the variables s1, I1, and "args" are the dynamic variables and the variables s2 and I2 are the automatic variables.

In the thread th2, variables "I", "m", and "s" are declared. The malloc function is not used in the thread th2 and therefore, the variables I, m, and s are automatic variables.

FIG. 3 is an explanatory diagram of an example of the variable lists. The global variable list 301 describes the global variables in the program 200 and includes the variables g1, g2, and g3.

The dynamic variable list 302 describes the dynamic variables in the program 200 and includes a variable field 304 and a thread field 305. The variable field 304 retains the names of the variables and the thread field 305 retains the names of the threads. For example, when the name of a variable presented by the variable field 304 is the variable s1, the name of a thread presented by the thread field 305 is the thread "main". In the first embodiment, it can be seen from the dynamic variable list 302 that the variable s1 is declared in the thread "main".

The automatic variable list 303 describes the automatic variables in the program 200 and includes a variable field 306 and a thread field 307. The variable field 306 retains the names of the variables and the thread field 307 retains the names of the threads. For example, when the name of a variable presented by the variable field 306 is the variable s2, the name of a thread presented by the thread field 307 is the thread "main". In the first embodiment, it can be seen from the automatic variable list 303 that the variable s2 is declared in the thread "main". All the variables included in the automatic variable list 303 are non-shared data.

FIG. 4 is a block diagram of a hardware configuration of a design support apparatus according to the embodiments. As depicted in FIG. 4, the design support apparatus includes a central processing unit (CPU) 401, a read-only memory (ROM) 402, a random access memory (RAM) 403, a magnetic disk drive 404, a magnetic disk 405, an optical disk drive 406, an optical disk 407, a display 408, an interface (I/F) 409, a keyboard 410, a mouse 411, a scanner 412, and a printer 413, respectively connected by a bus 400.

The CPU 401 governs overall control of the design support apparatus. The ROM 402 stores therein programs such as a boot program. The RAM 403 is used as a work area of the CPU 401. The magnetic disk drive 404, under the control of the CPU 401, controls the reading and writing of data with respect to the magnetic disk 405. The magnetic disk 405 stores therein data written under control of the magnetic disk drive 404.

The optical disk drive 406, under the control of the CPU 401, controls the reading and writing of data with respect to the optical disk 407. The optical disk 407 stores therein data written under control of the optical disk drive 406, the data being read by a computer.

The display 408 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 408.

The I/F 409 is connected to a network 414 such as a local area network (LAN), a wide area network (WAN), and the Internet through a communication line and is connected to other apparatuses through the network 414. The I/F 409 administers an internal interface with the network 414 and controls the input/output of data from/to external apparatuses. For example, a modem or a LAN adaptor may be employed as the I/F 409.

The keyboard 410 includes, for example, keys for inputting letters, numerals, and various instructions and performs the input of data. Alternatively, a touch-panel-type input pad or numeric keypad, etc. may be adopted. The mouse 411 is used to move the cursor, select a region, or move and change the size of windows. A track ball or a joy stick may be adopted provided each respectively has a function similar to a pointing device.

The scanner 412 optically reads an image and takes in the image data into the design support apparatus. The scanner 412 may have an optical character reader (OCR) function as well. The printer 413 prints image data and text data. The printer 413 may be, for example, a laser printer or an ink jet printer.

Figure 5:
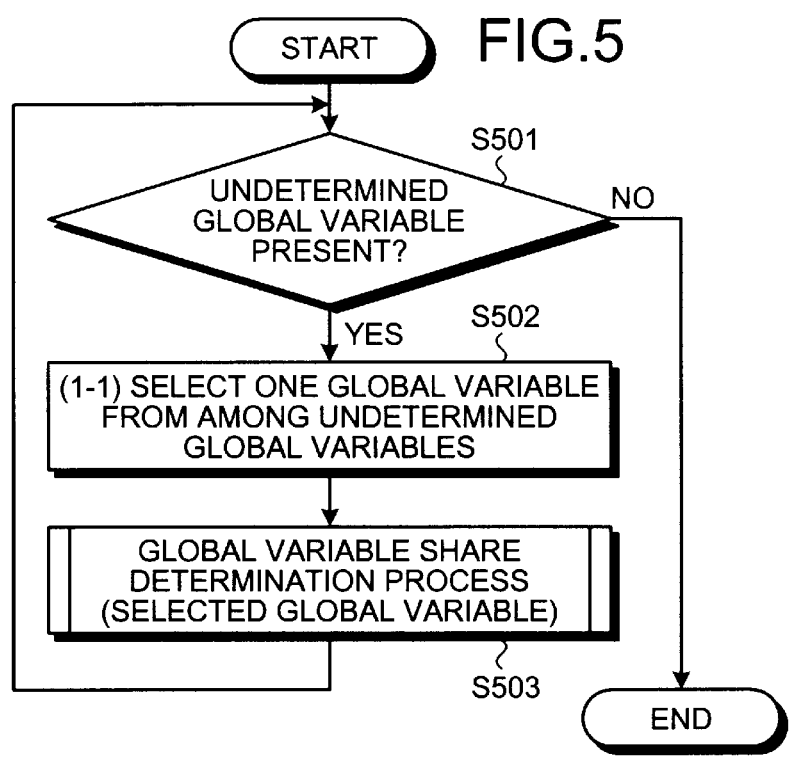
FIG. 5 is a flowchart of a design support process procedure concerning global variables and executed by the design support apparatus.

FIG. 5 is a flowchart of a design support process procedure concerning the global variables and executed by the design support apparatus. The design support apparatus first determines whether an undetermined global variable is present (step S501). If an undetermined global variable is present (step S501: YES), the design support apparatus selects one global variable from among the undetermined global variables (step S502).

The design support apparatus executes a global variable share determination process using the selected global variable as an argument (step S503) and the procedure returns to step S501. On the other hand, if the design support apparatus determines that no undetermined global variable is present (step S501: NO), the series of process steps comes to an end.

Figure 6:
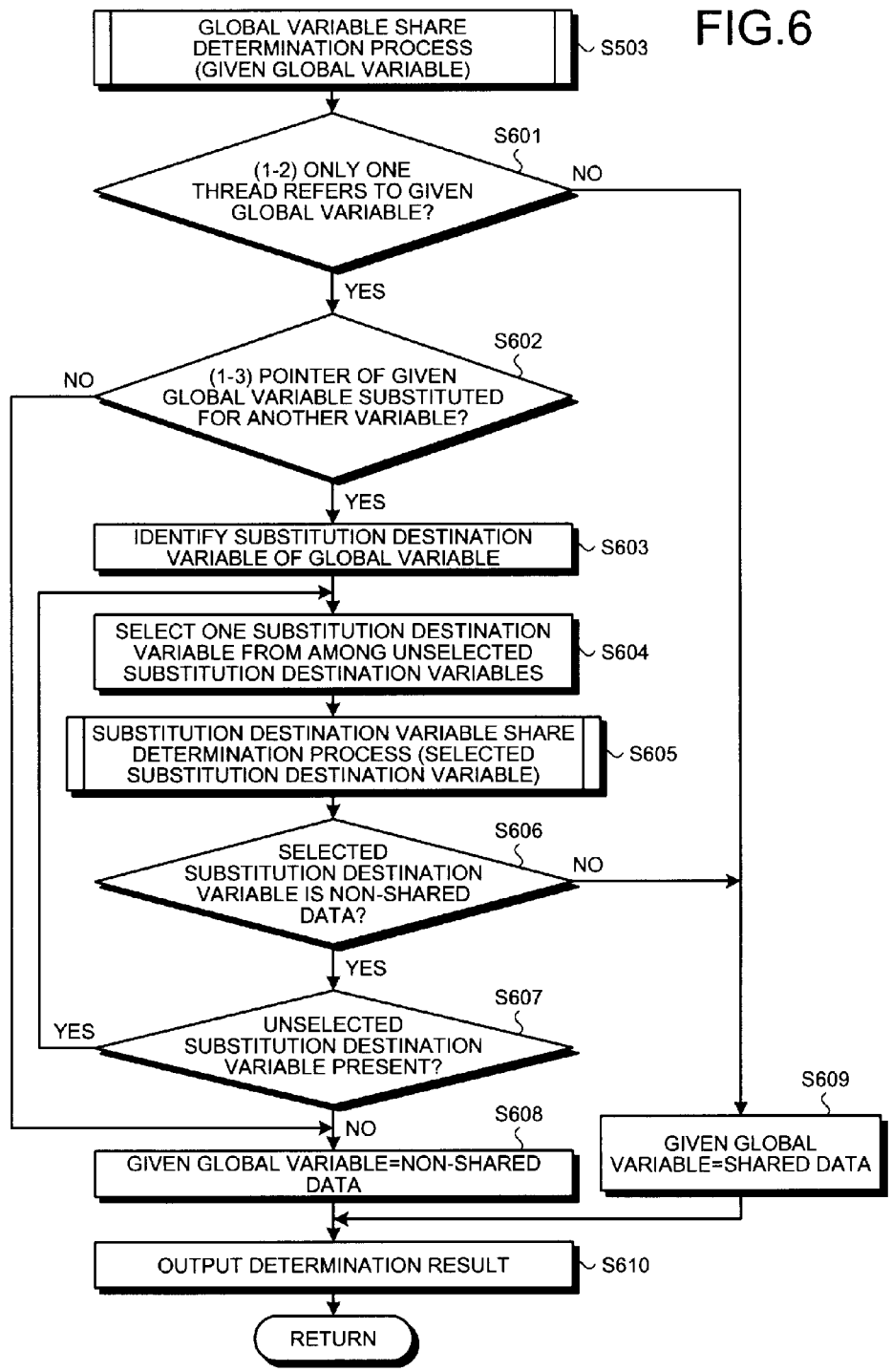
FIG. 6 is a detailed explanatory flowchart of a global variable share determination process (step S503) depicted in FIG. 5.

FIG. 6 is a detailed explanatory flowchart of the global variable share determination process (step S503) depicted in FIG. 5. The global variable share determination process (step S503) uses a given global variable as an argument. The design support apparatus first determines whether only one thread refers to the given global variable (step S601). If the design support apparatus determines that only one thread refers to the given global variable (step S601: YES), the design support apparatus determines whether a pointer of the given global variable is substituted for another variable (step S602).

If the design support apparatus determines that a pointer of the given global variable is substituted for another variable (step S602: YES), the design support apparatus identifies the substitution destination variable of the given global variable (step S603). The design support apparatus selects one substitution destination variable from among unselected substitution destination variables among the identified substitution destination variables (step S604).

The design support apparatus executes a substitution destination variable share determination process using the selected substitution destination variable as an argument (step S605) and determines whether the selected substitution destination variable is non-shared data (step S606). The substitution destination variable share determination process (step S605) is same as a substitution destination variable share determination process (step S703) described later and therefore, will not be described in detail in this paragraph. If the design support apparatus determines that the substitution destination variable selected is non-shared data (step S606: YES), the design support apparatus determines whether an unselected substitution destination variable is present (step S607).

If the design support apparatus determines that an unselected substitution destination variable is present (step S607: YES), the procedure returns to step S604. If the design support apparatus determines that no unselected substitution destination variable is present (step S607: NO), the design support apparatus determines that the given global variable is non-shared data (step S608).

If the design support apparatus determines at step S602 that no pointer of the given global variable is substituted for any other variable (step S602: NO), the procedure proceeds to step S608.

If the design support apparatus determines at step S601 that not only one thread refers to the given global variable (step S601: NO), the design support apparatus determines that the given global variable is shared data (step S609). If the design support apparatus determines at step S606 that the substitution destination variable selected is not non-shared data (step S606: NO), the procedure proceeds to step S609. Following step S608 or S609, the design support apparatus outputs the determination result (step S610) and the procedure returns to the process. To "return to the process" refers to returning to the process to continue it.

The form of the output of the determination result can be, for example, display on the display 408, output to the printer 413 for printing, and transmission by the I/F 409 to an external apparatus. The determination result may be stored in a storing apparatus such as the RAM 403, the magnetic disk 405, or the optical disk 407.

Figure 7:
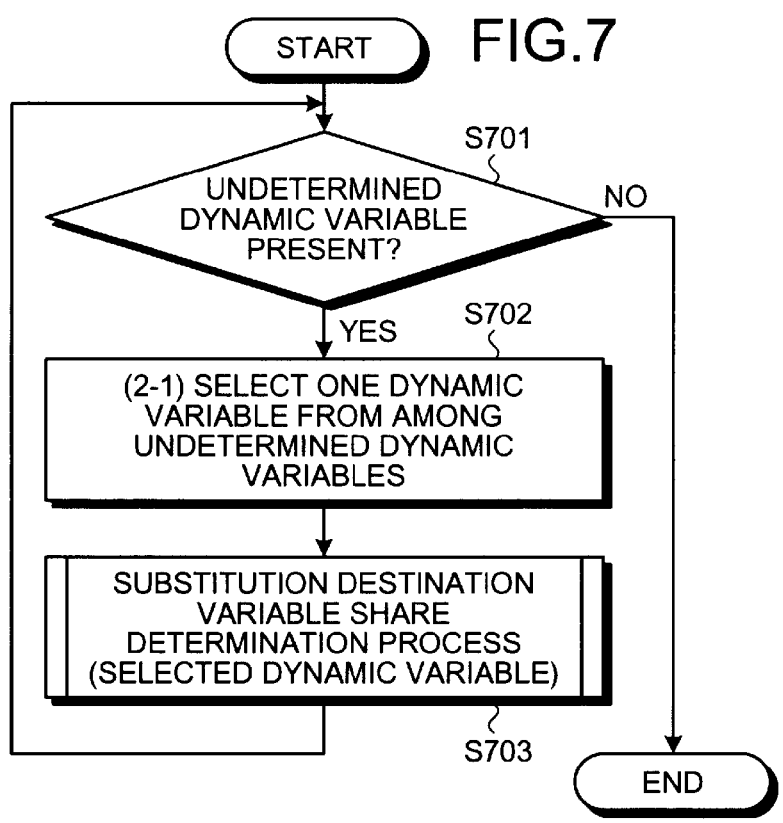
FIG. 7 is a flowchart of a design support process procedure concerning dynamic variables and executed by the design support apparatus.

FIG. 7 is a flowchart of a design support process procedure concerning the dynamic variables and executed by the design support apparatus. The design support apparatus first determines whether an undetermined dynamic variable is present (step S701). If the design support apparatus determines that an undetermined dynamic variable is present (step S701: YES), the design support apparatus selects one dynamic variable from among the undetermined dynamic variables (step S702).

The design support apparatus executes the substitution destination variable share determination process using the selected dynamic variable as an argument (step S703) and the procedure returns to step S701. If the design support apparatus determines that no undetermined dynamic variable is present (step S701: NO), the series of process steps come to an end.

Figure 8:
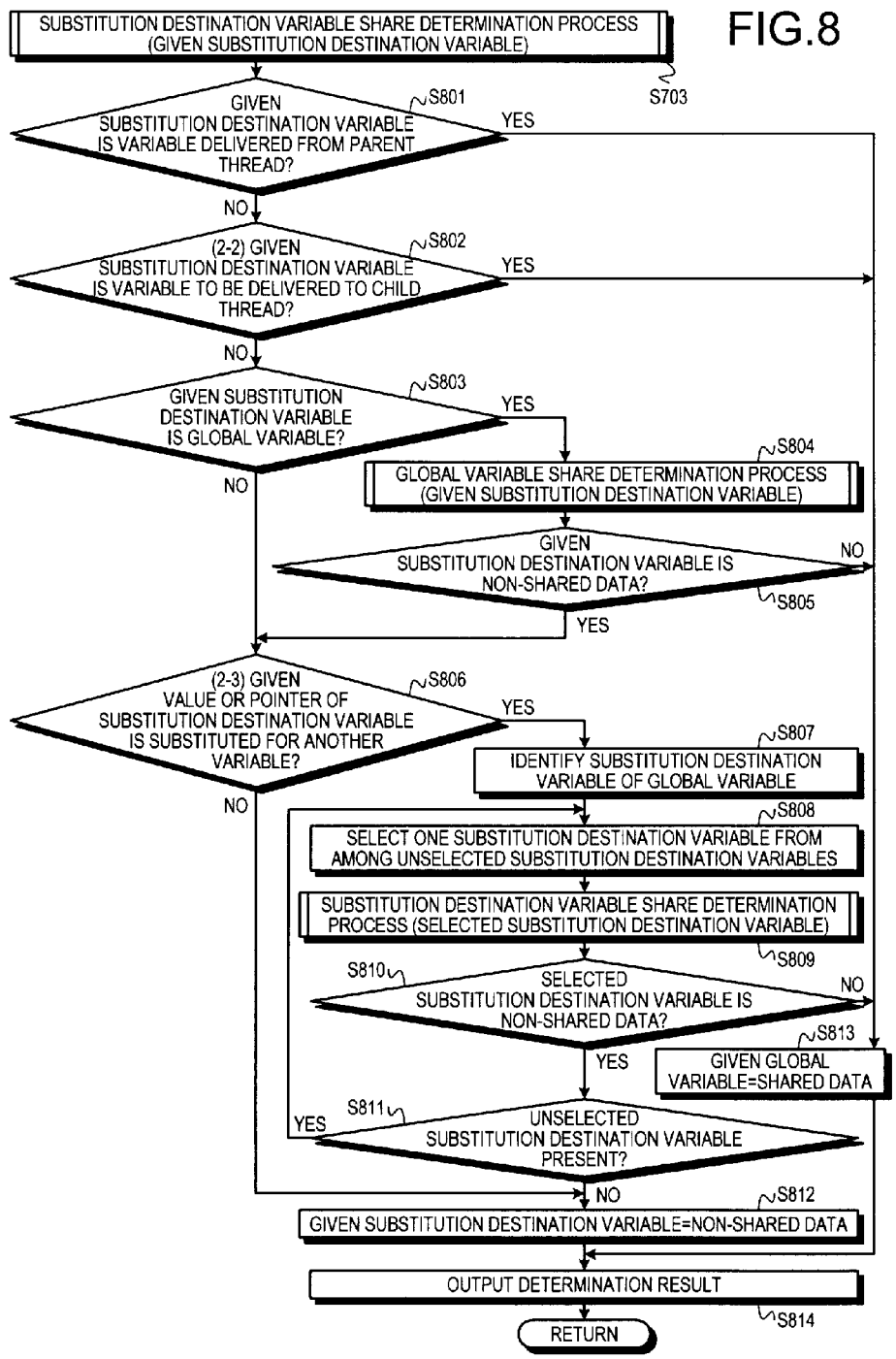
FIG. 8 is a detailed explanatory flowchart of a substitution destination variable share determination process (step S703) depicted in FIG. 7.

FIG. 8 is a detailed explanatory flowchart of the substitution destination variable share determination process (step S703) depicted in FIG. 7. The substitution destination variable share determination process (step S703) uses the given global variable as an argument. The design support apparatus first determines whether a given substitution destination variable to be used is a variable delivered from the parent thread (step S801).

If the design support apparatus determines that the given substitution destination variable is not a variable delivered from the parent thread (step S801: NO), the design support apparatus determines whether the given substitution destination variable is a variable to be delivered to a child thread (step S802). If the design support apparatus determines that the given substitution destination variable is not a variable to be delivered to a child thread (step S802: NO), the design support apparatus determines whether the given substitution destination variable is a global variable (step S803).

If the design support apparatus determines that the given substitution destination variable is a global variable (step S803: YES), the design support apparatus executes the global variable share determination process using the given substitution destination variable as an argument (step S804). The global variable share determination process (step S804) is the same process as the above global variable share determination process (step S503) and therefore, will not be described in detail. The design support apparatus determines whether the given substitution destination variable is non-shared data (step S805).

If the design support apparatus has determined that the given substitution destination variable is non-shared data (step S805: YES), the design support apparatus determines whether the value or the pointer of the given substitution destination variable is substituted for another variable (step S806). If the design support apparatus determines that the given substitution destination variable is not a global variable (step S803: NO), the procedure proceeds to step S806.

If the design support apparatus determines that the value or the pointer of the given substitution destination variable is substituted for another variable (step S806: YES), the design support apparatus identifies the substitution destination variable (step S807). The design support apparatus selects one substitution destination variable from among the unselected substitution destination variables (step S808) and executes the substitution destination variable share determination process using the selected substitution destination variable (step S809). The substitution destination variable share determination process (step S809) and the substitution destination variable share determination process (step S703) are same processes.

The design support apparatus determines whether the selected substitution destination variable is non-shared data (step S810). If the design support apparatus determines that the selected substitution destination variable is non-shared data (step S810: YES), the design support apparatus determines whether an unselected substitution destination variable is present (step S811). If the design support apparatus determines that an unselected substitution destination variable is present (step S811: YES), the procedure returns to step S808.

On the other hand, if the design support apparatus determines that no unselected substitution destination variable is present (step S811: NO), the design support apparatus determines that the given substitution destination variable is non-shared data (step S812). If the design support apparatus determines at step S806 that the value or the pointer of the given substitution destination variable is not substituted for another variable (step S806: NO), the procedure proceeds to step S812.

If the design support apparatus determines at step S801 that the given substitution destination variable is a variable delivered from the parent thread (step S801: YES), the design support apparatus determines that the given global variable is shared data (step S813). If the design support apparatus determines at step S802 that the given substitution destination variable is a variable to be delivered to a child thread (step S802: YES), the procedure proceeds to step S813.

If the design support apparatus determines at step S805 that the design support apparatus does not determine that the given substitution destination variable is non-shared data (step S805: NO), the procedure proceeds to step S813. If the design support apparatus determines at step S810 that the substitution destination variable selected is not non-shared data (step S810: NO), the procedure proceeds to step S813.

Following step S812 or S813, the design support apparatus outputs the determination result (step S814) and the procedure returns to the process. The form of the output of the determination result can be, for example, display on the display 408, output to the printer 413 for printing, and transmission by the I/F 409 to an external apparatus. The determination result may be stored in the storing apparatus such as the RAM 403, the magnetic disk 405, or the optical disk 407.

An example will be described based on the above. An example of determination of the global variable will be described first followed by an example of determination of the dynamic variable. "(1-1) to (1-3)" and "(2-1) to (2-3)" depicted in FIGS. 9 to 13 correspond to "(1-1) to (1-3)" and "(2-1) to (2-3)" of the flowcharts depicted in FIGS. 5 to 8.

FIG. 9 is an explanatory diagram of a first example of determination of the global variable. The design support apparatus (1-1) selects the variable g3 from among the global variables. The design support apparatus (1-2) determines that the variable g3 is shared data because the variable g3 is referred to by the threads th1 and th2.

FIG. 10 is an explanatory diagram of a second example of determination of the global variable. The design support apparatus (1-1) selects the variable g2 from among the global variables. (1-3) The variable g2 is substituted for the variable I2 that is another variable. The variable I2 is an automatic variable and therefore, is non-shared data. Therefore, the design support apparatus determines that the variable g2 is non-shared data.

Figure 11:
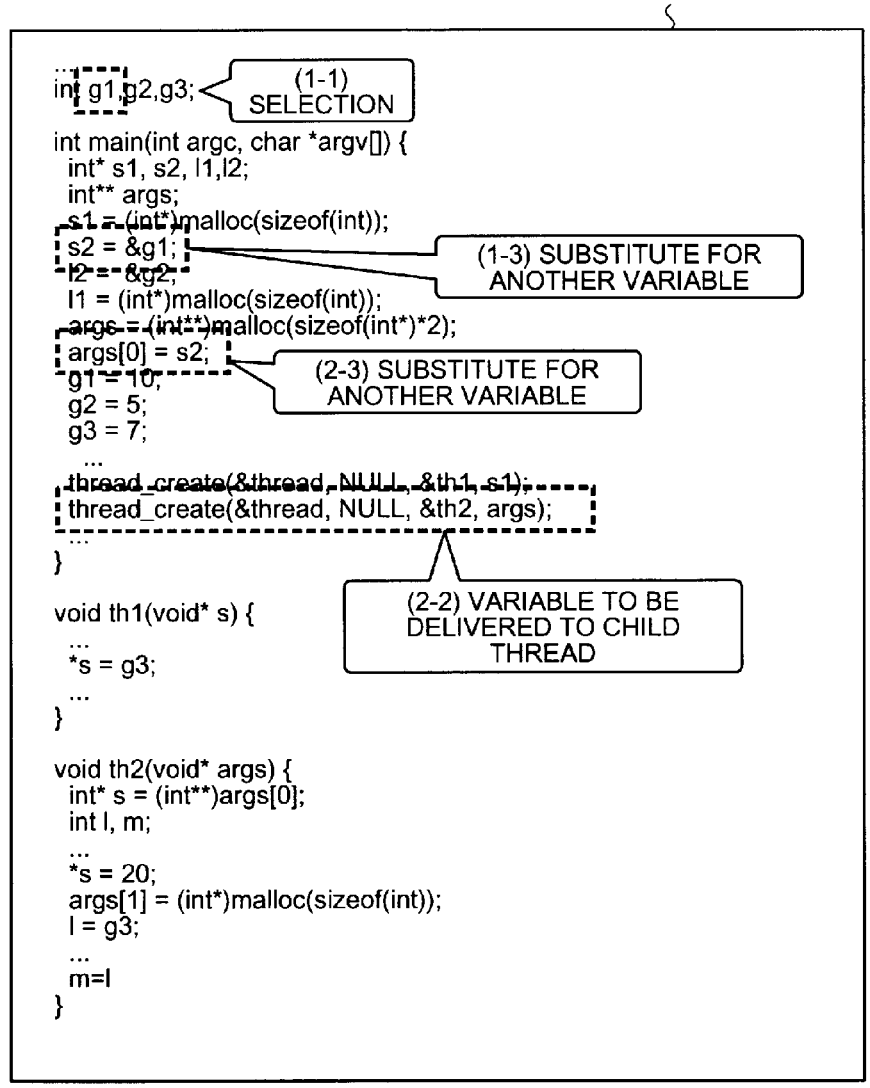
FIG. 11 is an explanatory diagram of a third example of determination of the global variable.

FIG. 11 is an explanatory diagram of a third example of determination of the global variable. The design support apparatus (1-1) selects the variable g1 from among the global variables. (1-3) The variable g1 is substituted for the variable s2 that is another variable. (2-3) The variable s2 is substituted for the variable "args" that is further another variable. (2-2) The variable "args" is the variable to be delivered to the thread th2 that is the child thread of the thread "main" and therefore, the design support apparatus determines that the variable g1 is shared data.

FIG. 12 is an explanatory diagram of a first example of determination of the dynamic variable. The design support apparatus (2-1) selects the variable I1 from among the dynamic variables. The variable I1 is not substituted for any other variable and therefore, the design support apparatus determines that the variable I1 is non-shared data.

FIG. 13 is an explanatory diagram of a second example of determination of the dynamic variable. The design support apparatus (2-1) selects the variable s1 from among the dynamic variables. (2-2) The variable s1 is the variable to be delivered to the thread th1 that is the child thread of the thread "main" and therefore, the design support apparatus determines that the variable s1 is shared data.

FIG. 14 is an explanatory diagram of an example of the determination result. A shared global variable list 1401 describes the global variables that each are determined to be shared data. The shared global variable list 1401 describes the variables g1 and g3.

A shared dynamic variable list 1402 describes the dynamic variables that are each determined to be shared data. The shared dynamic variable list 1402 describes a variable field 1405 and a thread field 1406. The variable field 1405 retains the names of the variables and the thread field 1406 retains the names of the threads. The shared dynamic variable list 1402 has the variables "args" and s1 in the thread th1, described therein.

A non-shared global variable list 1403 describes the global variables that are each determined to be non-shared data. The non-shared global variable list 1403 describes the variable g2.

A non-shared dynamic variable list 1404 describes the automatic variables that are each determined to be non-shared data. The non-shared dynamic variable list 1404 describes a variable field 1407 and a thread field 1408. The variable field 1407 retains the names of the variables and the thread field 1408 retains the names of the threads. The non-shared dynamic variable list 1404 describes the variable I1 in the thread th1.

FIG. 15 is a flowchart of a load module generation process procedure executed by the design support apparatus. The design support apparatus first changes the code such that a portion to secure non-shared dynamic variables (the dynamic variables that each is non-shared data) is secured from a LOCAL_HEAP area (step S1501). The design support apparatus calculates the sizes of the object code, the shared global variables (the global variables that are each shared data), and the non-shared global variables (the global variables that are each shared data) (step S1502).

The design support apparatus determines in the virtual memory space, the location of an object code area, a shared global variable area, and a non-shared global variable area (step S1503). The design support apparatus changes addresses of the shared global variables in the object code to the determined addresses of the shared global variables (step S1504).

The design support apparatus changes the addresses of the non-shared global variables in the object code to the determined addresses of the non-shared global variables (step S1505) and generates a load module (step S1506) and the series of process steps comes to an end.

Figure 16:
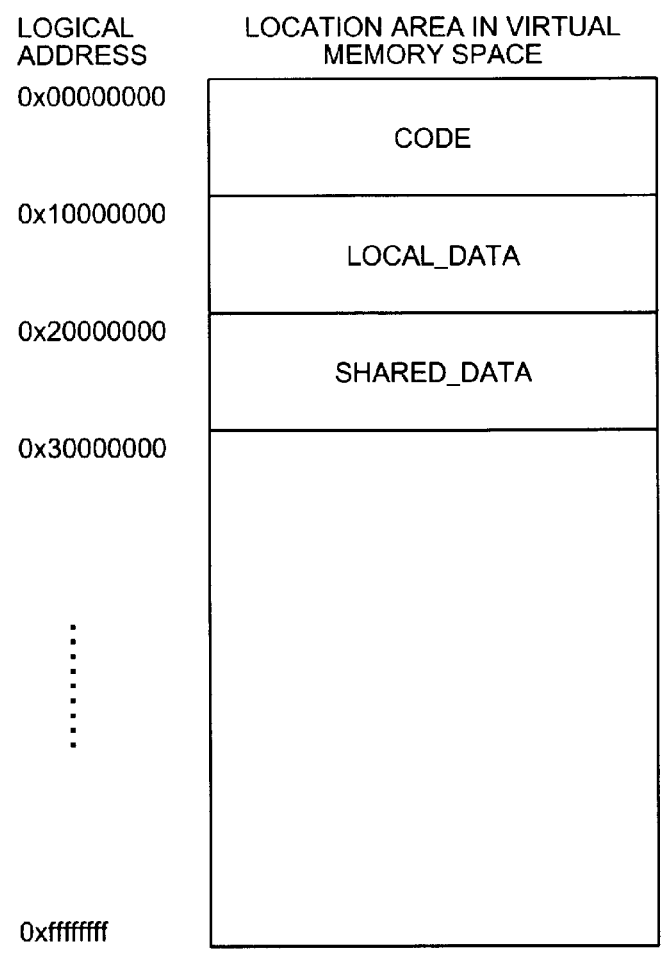
FIG. 16 is an explanatory diagram of an example of location of information in a virtual memory space.

FIG. 16 is an explanatory diagram of an example of the location of information in the virtual memory space. For example, the virtual memory space has logical addresses "0x00000000" to "0xffffffff" that are virtual addresses. "CODE", which is the object code, is disposed at logical addresses "0x00000000" to "0x0fffffff" in the virtual memory space.

"LOCAL_DATA" representing the non-shared global variables is disposed at logical addresses "0x10000000" to "0x1fffffff" in the virtual memory space. "SHARED_DATA" representing the non-shared global variables is disposed at logical addresses "0x20000000" to "0x2fffffff" in the virtual memory space.

Figure 17:
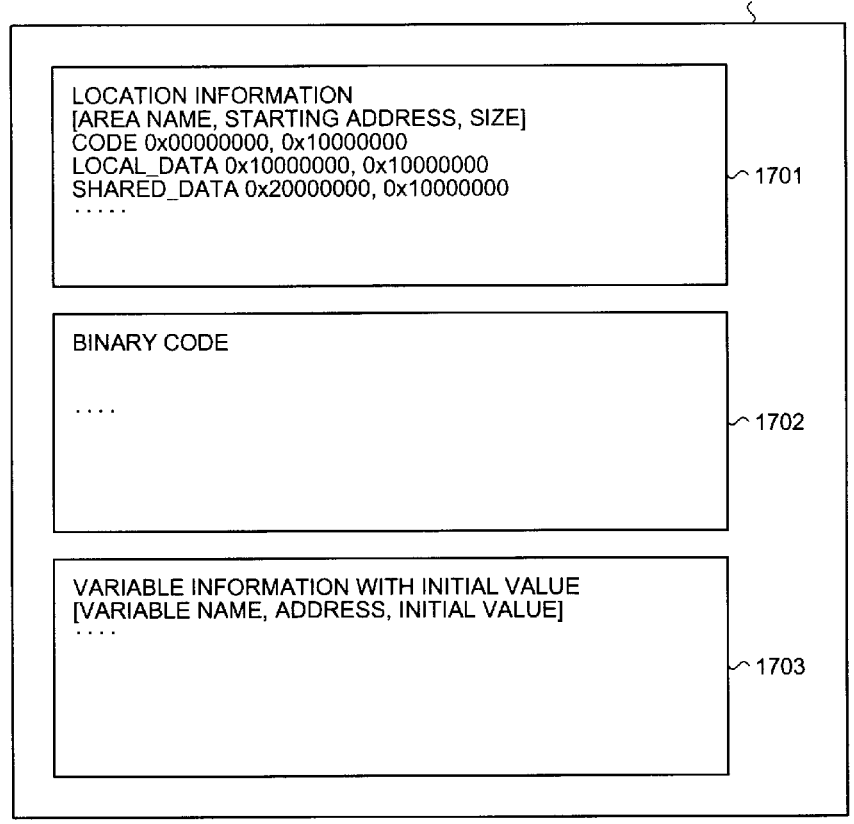
FIG. 17 is an explanatory diagram of an example of the load module generated.

FIG. 17 is an explanatory diagram of an example of the generated load module. The load module 1700 has "location information" 1701, "binary code" 1702, and "variable information with an initial value" 1703. The "binary code" 1702 describes codes that are binary data formed by compiling the object codes. The "variable information with an initial value" 1703 describes the name of the variable, a logical address thereof, and an initial value thereof, for each of the variables whose initials values are declared in the object code. The location information 1701 describes the name of an area in the virtual memory space, the starting address thereof, and the size thereof and, for example, "CODE" is disposed from the logical address "0x00000000" and its size is "0x10000000".

In the second embodiment, the example where the non-shared data is not stored in a shared cache memory but is stored in a distributed cache memory of a CPU that uses the non-shared data will be described.

Figure 18:
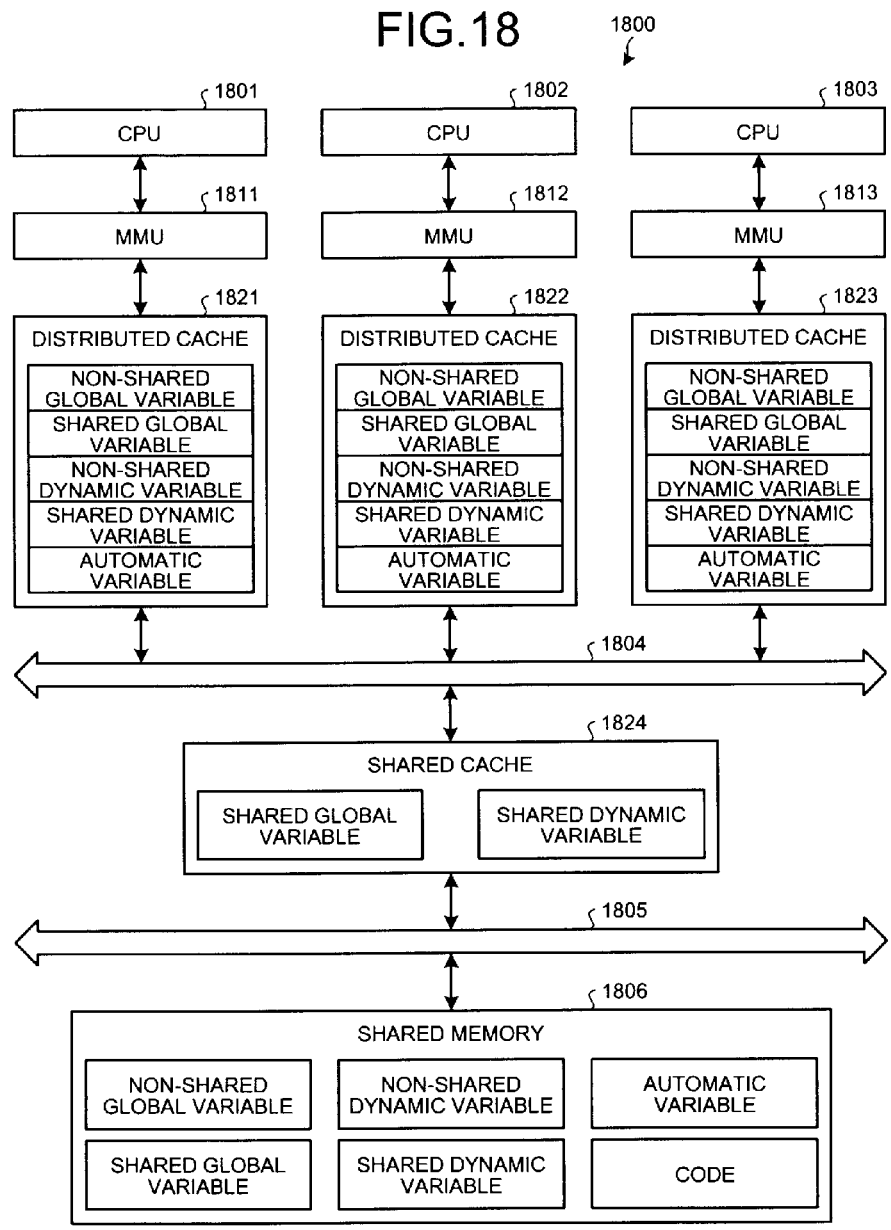
FIG. 18 is an explanatory diagram of an example of use of cache memories.

FIG. 18 is an explanatory diagram of an example of use of the cache memories. For example, each of the distributed caches stores therein the non-shared global variables, the shared global variables, the non-shared dynamic variables, the shared dynamic variables, and the automatic variables that are non-shared data, respectively. The distributed cache stores therein the variables regardless of whether each of the variables is shared data or non-shared data.

On the other hand, for example, a shared cache 1824 stores the shared global variables and the shared dynamic variables, that is, stores the shared global variables and the shared dynamic variables that each are shared data. In the second embodiment, the area of the shared cache 1824 can efficiently be used by storing only the variables in the shared cache 1824, that each may be used by plural CPUs.

In a multi-core processor system 1800 described in the second embodiment (and the third embodiment described later), a "multi-core processor" is a processor that has plural cores. A single processor having plural cores may be employed only when the plural cores provided, or a processor group may be employed having single-core processors in parallel. In the embodiment, for simplification of the description, the description will be made taking an example of a processor group having single-core processors in parallel.

Figure 19:
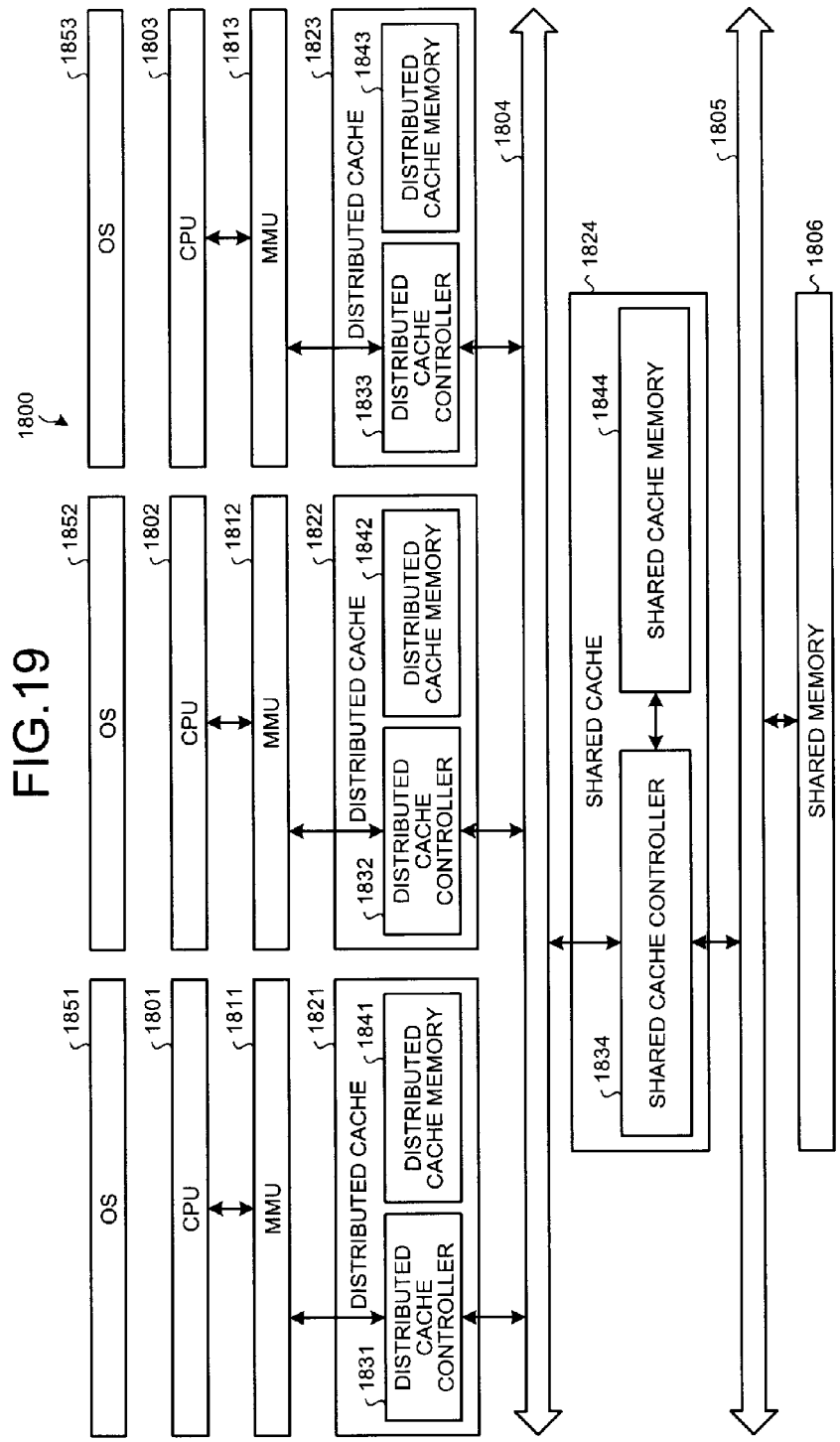
FIG. 19 is a block diagram of hardware of a multi-core processor system 1800.

FIG. 19 is a block diagram of hardware of the multi-core processor system 1800. In FIG. 19, the multi-core processor system 1800 includes CPUs 1801 to 1803, memory management units (MMUs) 1811 to 1813, distributed caches 1821 to 1823, a shared cache 1824, and a shared memory 1806.

The CPU 1801 and the MMU 1811 are connected to each other, and the MMU 1811 and the distributed cache 1821 (for example, a distributed cache controller 1831) are connected to each other. The CPU 1802 and the MMU 1812 are connected to each other, and the MMU 1812 and the distributed cache 1822 (for example, a distributed cache controller 1832) are connected to each other. The CPU 1803 and the MMU 1813 are connected to each other, and the MMU 1813 and the distributed cache 1823 (for example, a distributed cache controller 1833) are connected to each other. The distributed cache controller of each of the distributed caches and a shared cache controller 1834 of the shared cache 1824 are connected to each other through a coupling network 1804. The shared cache 1824 and the shared memory 1806 are connected to each other through a bus 1805.

Each of the CPUs 1801 to 1803 includes a core and a register. The CPU 1801 executes an OS 1851 and supervises the control of the entire multi-core processor system 1800. The OS 1851 has a function of controlling which process of software is assigned to which CPU and a function of controlling switching of a task assigned to the CPU 1801.

The CPUs 1802 and 1803 are slave CPUs and respectively execute OSs 1852 and 1853. The OSs 1852 and 1853 each has a function of controlling switching of a task assigned to each corresponding CPU.

Each of the MMUs 1811 to 1813 has a function of converting a logical address attached to an access request into a physical address using a conversion table when each of the MMUs 1811 to 1813 receives the access request from the CPU connected thereto. The conversion table will be described later.

The distributed cache 1821 includes the distributed cache controller 1831 and a distributed cache memory 1841. The distributed cache controller 1831 controls reading and writing with respect to the distributed cache memory 1841. The distributed cache 1822 includes the distributed cache controller 1832 and a distributed cache memory 1842. The distributed cache controller 1832 controls reading and writing with respect to the distributed cache memory 1842. The distributed cache 1823 includes the distributed cache controller 1833 and a distributed cache memory 1843. The distributed cache controller 1833 controls reading and writing with respect to the distributed cache memory 1843.

The shared cache 1824 includes the shared cache controller 1834 and a shared cache memory 1844. The shared cache controller 1834 controls reading and writing with respect to the shared cache memory.

FIG. 20 is an explanatory diagram of an example of the distributed cache memory 1841. The distributed cache memory 1841 includes tag information and data. The tag information includes address information and area information. The distributed cache controller 1831 searches for the corresponding data from the address information of the tag information of the distributed cache memory 1841, based on the address information included in a read request. A combination of the data and the tag information is referred to as a "cache line".

The distributed cache memory 1841 stores data of various addresses of the shared memory 1806. Therefore, the distributed cache memory 1841 stores the address information indicating which address of data in the shared memory 1806 each data is, together with the data as a combination. Without the address information, it can not be determined whether the variable is stored in the cache in response to an access request (a read request or a write request) from the CPU.

The area information includes an "Invalid" bit that indicates whether the cache line includes effective data and a "Modified" bit that indicates whether the data in the cache memory: remains as it is read from the shared memory 1806; or is rewritten.

In the second and the third embodiments, the area information further includes a sharing bit that indicates whether the data is shared data or non-shared data. As to whether the data is shared data or non-shared data, the distributed cache controller 1831 manipulates the value of the sharing bit based on an area attribute added to the access request from the MMU 1811. For example, when the sharing bit is "1", this indicates that the data is shared data and when the sharing bit is "0", this indicates that the data is non-shared data.

It is assumed that each of the distributed cache memories 1842 and 1843 and the shared cache memory 1844 includes the area information and the data similarly to the distributed cache memory 1841, and examples of each will not be given in detail.

Referring back to FIG. 19, the shared memory 1806 is a memory that is shared by the CPUs 1801 to 1803. The shared memory 1806 includes, for example, a read only memory (ROM), a random access memory (RAM), a flash ROM, etc. The shared memory 1806 stores, for example, a process management table; programs such as boot programs of the OSs 1851 and 1852 and a control program described later; and a load module 1700.

For example, the ROM or the flash ROM stores the programs, etc. and the RAM is used as a work area of the CPUs 1801 to 1803. The OSs 1851 to 1853 stored in the shared memory 1806 cause the CPUs to execute coded processes, by being loaded in the CPUs.

The process management table is information that indicates, for example, to which CPU each of the threads is assigned and whether the CPU assigned with a thread is currently executes the thread. Each of the CPUs reads the process management table and stores the process management table in the cache of the CPU. When the OS 1851 assigns the thread to any one of the CPUs 1801 to 1803, the OS 1851 registers the result as to which CPU the thread is assigned to, in the process management table.

An example will be described where the data is mapped from the virtual memory space to the shared memory 1806 based on the load module 1700 generated in the first embodiment.

Figure 21:
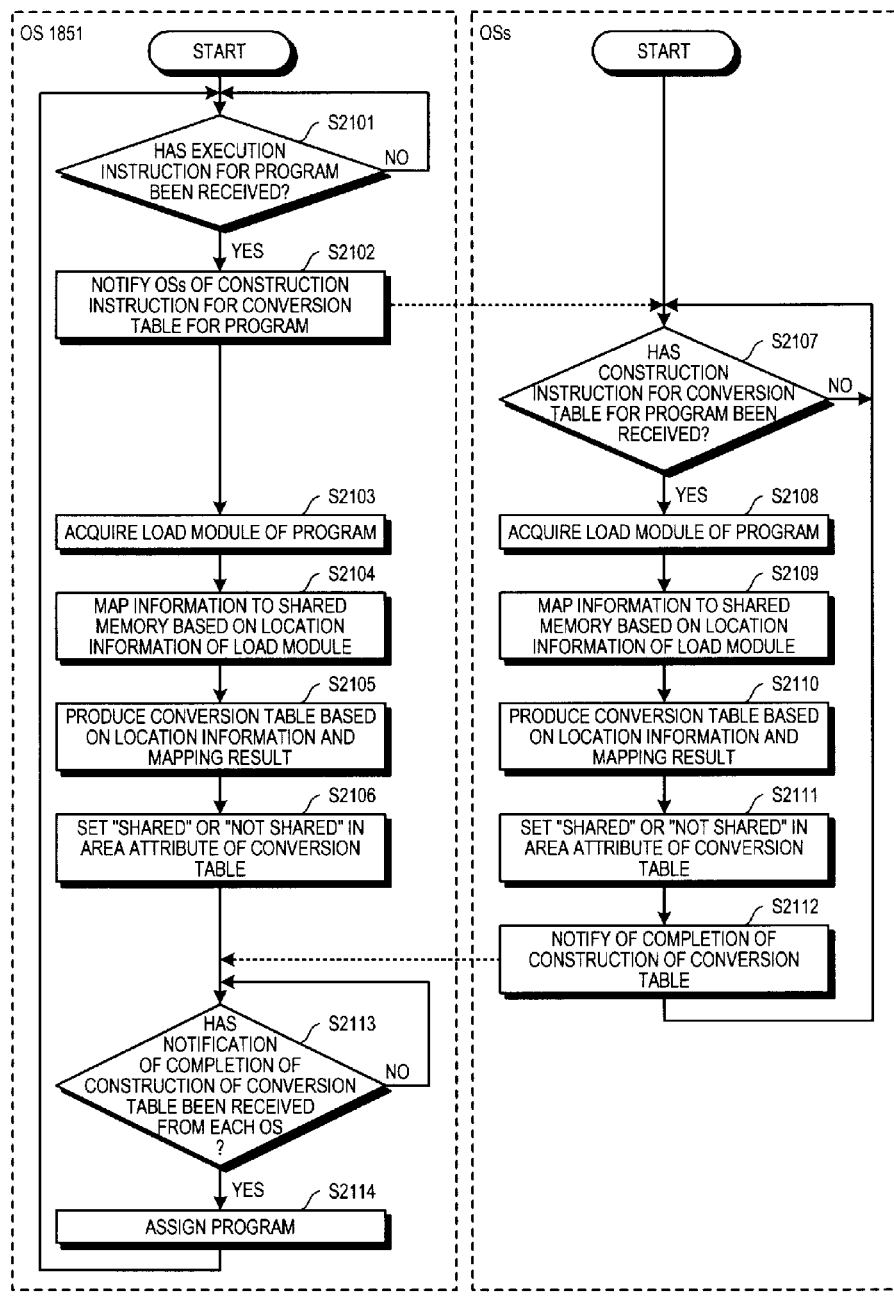
FIG. 21 is a flowchart of an expansion process procedure of a load module 1700 by an OS.

FIG. 21 is a flowchart of an expansion process procedure of the load module 1700 by the OS. The OS 1851 first determines whether the OS 1851 has received an execution instruction for a program (step S2101). If the OS 1851 determines that the OS 1851 has not received an execution instruction for a program (step S2101: NO), the procedure returns to step S2101. On the other hand, if the OS 1851 determines that the OS 1851 has received an execution instruction for a program (step S2101: YES), the OS 1851 notifies the OSs of a construction instruction for a conversion table for the program for which the execution instruction has been received (step S2102).

The OS 1851 acquires the load module of the program for which the execution instruction has been received (step S2103). The load module is stored to the shared memory 1806. When the OS 1851 acquires the information on the load module, the OS 1851 maps information from the virtual memory space to the shared memory 1806 based on the location information 1701 of the load module 1700 (step S2104). The OS 1851 generates the conversion table based on the location information 1701 and the mapping result (step S2105) and sets "shared" or "not shared" in the area attribute of the conversion table (step S2106).

Each of the OSs except the OS 1851 determines whether the OS has received a construction instruction for the conversion table for the program for which the execution instruction has been received (step S2107). Hereinafter, the OSs except the OS 1851 are simply referred to as "the OSs". When each of the OSs determines that the OS has not received a construction instruction for the conversion table for the program for which the execution instruction has been received (step S2107: NO), the procedure returns to step S2107. If each of the OSs determines that the OS has received a construction instruction for the conversion table of the program for which the execution instruction has been received (step S2107: YES), each of the OSs acquires the load module of the program for which the execution instruction has been received (step S2108).

If each of the OSs acquires the information on the load module, the OS maps the information from the virtual memory space to the shared memory 1806 based on the location information 1701 of the load module 1700 (step S2109). Each of the OSs generates the conversion table based on the location information 1701 and the mapping result (step S2110) and sets "shared" or "not shared" in the area attribute of the conversion table (step S2111). Each of the OSs notifies the OS 1851 of completion of the construction of the conversion table (step S2112) and the procedure returns to step S2107.

The OS 1851 determines whether the OS 1851 has received notification of the completion of the construction of the conversion table from each of the OSs except the OS 1851 (step S2113). If the OS 1851 determines that the OS 1851 has not received notification of the completion of the construction of the conversion table (step S2113: NO), the procedure returns to step S2113. If the OS 1851 determines that the OS 1851 has received notification of the completion of the construction of the conversion table (step S2113: YES), the OS 1851 executes assignment of the program for which the execution instruction has been received (step S2114) and the procedure returns to step S2101.

Figure 22:
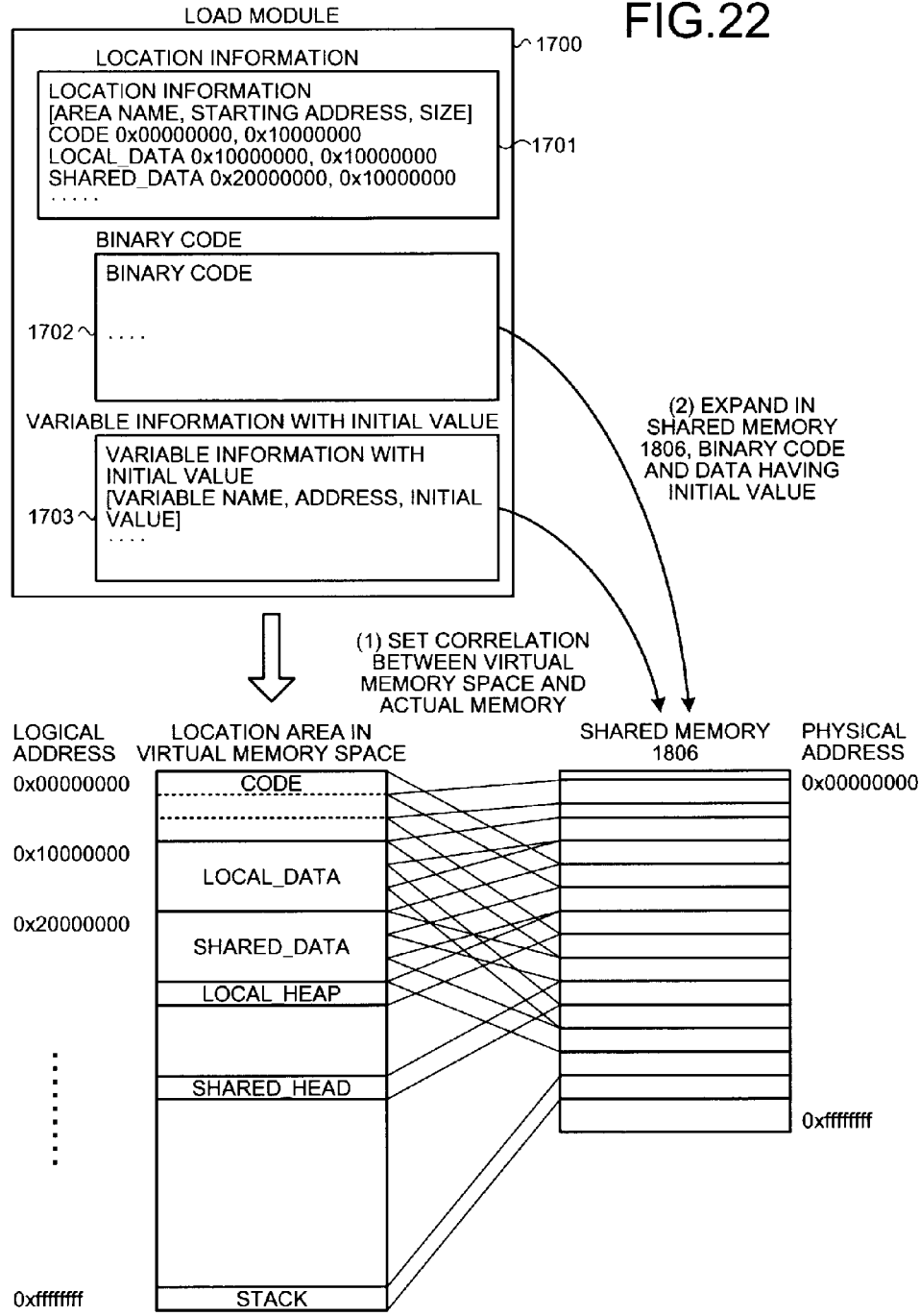
FIG. 22 is an explanatory diagram of an example where data is mapped from the load module 1700 to the shared memory 1806.

FIG. 22 is an explanatory diagram of an example where the data is mapped from the load module 1700 to the shared memory 1806. As depicted in FIG. 22, the OS 1851 (1) sets the correlation between the virtual memory space and the shared memory 1806 that is a real memory based on the location information 1701. The OS 1851 (2) expands the binary code 1702 and the data with the initial value in the memory.

Figures 23, 24:
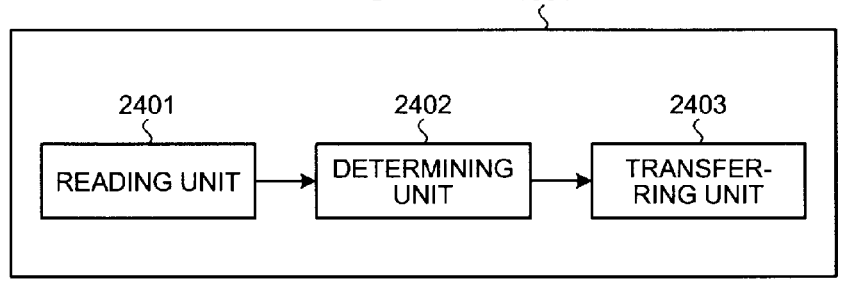
FIG. 23 is an explanatory diagram of an example of a conversion table.
FIG. 24 is a functional block diagram of a shared cache controller 1834 according to a second embodiment.

FIG. 23 is an explanatory diagram of an example of the conversion table. A conversion table 2300 is a table generated by the OS 1851 and stored in the register of each of the MMUs, and has a logical address field 2301, a physical address field 2302, and an area attribute field 2303. The logical address field 2301 retains the logical addresses and the physical address field 2302 retains the physical addresses that correspond to the logical addresses.

The area attribute field 2303 retains the area attributes of the variables that correspond to the addresses. The area attribute presents a cache mode and an access attribute that are commonly known; and information indicating whether the variable corresponding to each of the addresses is shared data or non-shared data. In the embodiment, information on the cache mode and the access attribute is not included in the area attribute and the area attribute is information that simply indicates whether the variable is shared data or non-shared data. The information indicating whether the variable is shared data or non-shared data is referred to as "shared bit". When the shared bit is "1", this indicates that data of the physical address is shared data and, when the shared bit is "0", this indicates that data of the physical address is non-shared data.

FIG. 24 is a functional block diagram of the shared cache controller 1834 according to the second embodiment. The shared cache controller 1834 includes, for example, a reading unit 2401, a determining unit 2402, and a transferring unit 2403.

For example, functions of these units are each defined by an HDL description; elements such as a logical circuit, etc. are combined by logically coupling the HDL descriptions; and thereby, these units can be realized in the shared cache controller 1834. For example, these units may be stored as control programs in the shared memory 1806; and the shared cache controller 1834 having a function capable of executing programs like each of the CPUs may load the control programs and execute processes coded in the control programs.

The reading unit 2401 reads a value of the variable to be used from the shared memory 1806.

The determining unit 2402 determines whether the variable to be used is shared data to be referred to by plural threads or non-shared data to be referred to by one thread, based on a read request for the variable to be used.

If the determining unit 2402 determines that the variable to be used is non-shared data, the transferring unit 2403 transfers the value of the variable read by the reading unit 2401, to a first cache memory of the CPU that is the read request origin without using a second cache memory. In this case, the first cache memory is a distributed cache memory and the second cache memory is the shared cache memory 1844.

An example will be described based on the above.

Figure 25:
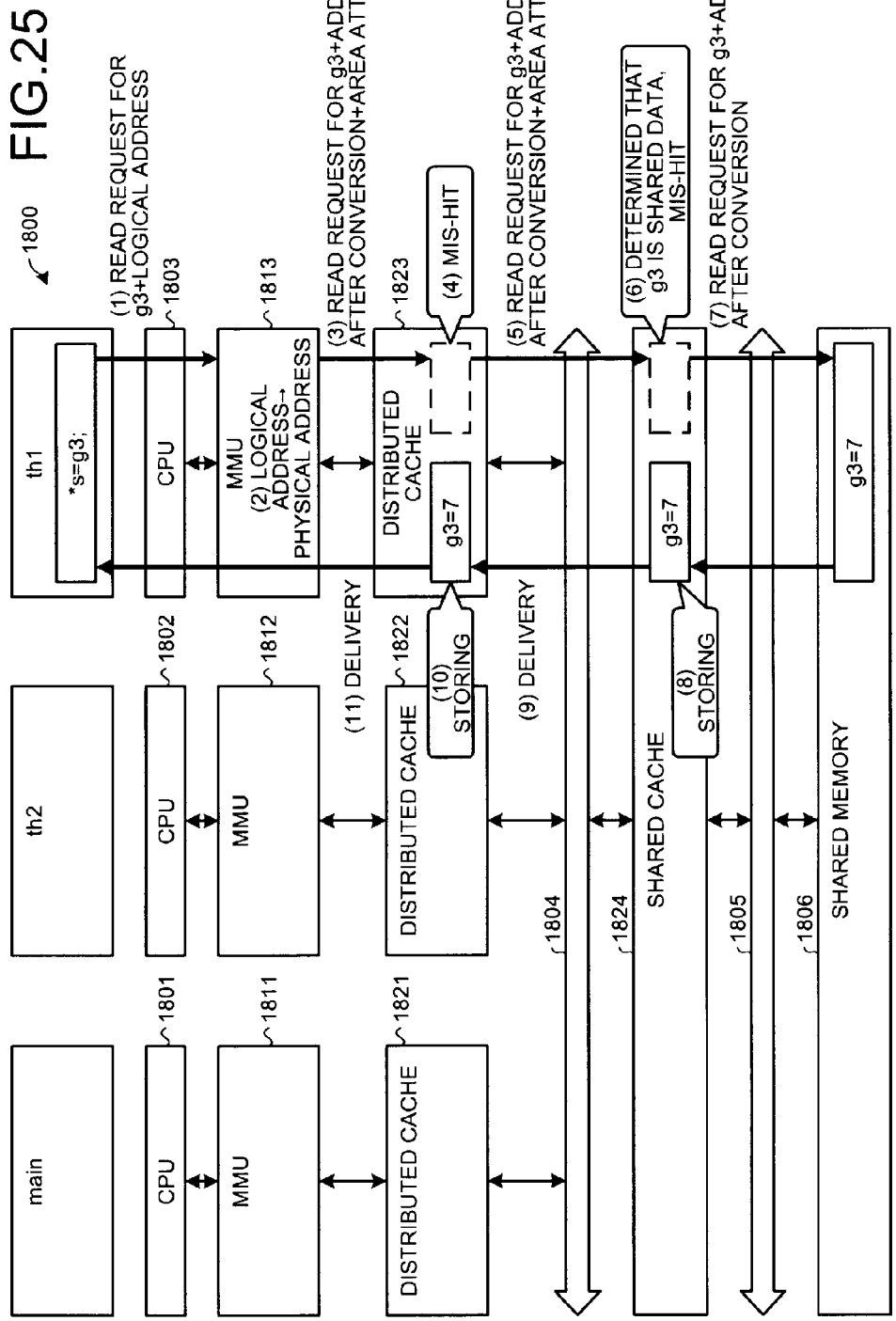
FIG. 25 is an explanatory diagram of an example where shared data is read from shared memory 1806.

FIG. 25 is an explanatory diagram of an example where the shared data is read from the shared memory 1806. The program 200 is currently executed. The thread "main" is assigned to the CPU 1801, the thread th2 is assigned to the CPU 1802, and the thread th1 is assigned to the CPU 1803. When "*s=g3" in the thread th1 is executed, the OS 1853 (1) notifies the MMU 1813 of a reading request for the variable g3 with which the logical address of the variable g3 is correlated.

The MMU 1813 (2) converts the logical address of the variable g3 into a physical address based on the conversion table 2300. The MMU 1813 extracts from the conversion table 2300, the area attribute that corresponds to the logical address of the variable g3. The MMU 1813 correlates the address of the variable g3 after the conversion and the area attribute with the read request for the variable g3, and notifies the distributed cache 1823 of the read request of the variable g3 correlated therewith.

When the distributed cache controller 1833 receives the read request, the distributed cache controller 1833 determines whether the variable g3 is stored in the distributed cache memory 1843, based on the address after the conversion that is received; and, at this time, (4) determines a MIS-HIT. The distributed cache controller 1833 (5) correlates the address after the conversion and the area attribute with the read request for the variable g3, and notifies the shared cache 1824 of the read request for the variable g3 correlated therewith.

When the shared cache controller 1834 receives the read request for the variable g3, the shared cache controller 1834 (6) determines whether the variable g3 is shared data, based on the received area attribute. As above, the area attribute has the shared bit that indicates whether the variable is shared data or non-shared data. At this time, the shared cache controller determines that the variable g3 is shared data.

The shared cache controller 1834 determines whether the variable g3 is stored in the shared cache memory 1844, based on the tag information of each of the address after the conversion received and the shared cache memory 1844. At this time, the shared cache controller 1834 determines a MIS-HIT. The shared cache controller 1834 (7) correlates the address after the conversion with the read request for the variable g3, notifies the shared memory 1806 of the read request for the variable g3 correlated therewith, and thereby, reads the value of the variable g3 from the shared memory 1806.

Because the variable g3 is shared data, the shared cache controller 1834 (8) stores the variable g3 read, in the shared cache memory 1844. The shared cache controller 1834 (9) delivers the variable g3 read, to the distributed cache 1823 and the distributed cache controller 1833 (10) stores the variable g3 in the distributed cache memory 1843.

The distributed cache controller 1833 (11) delivers the variable g3 read, to the thread th1 currently executed. "*s=g3" is executed. After the thread th1 is executed, for the thread th2, the CPU 1802 reads the variable g3 to refer to the variable g3 to execute "I=g3". When it is determined that the data to be used is shared data, the process executed by the shared cache controller 1834 is same as the ordinary cache operation process.

Figure 26:
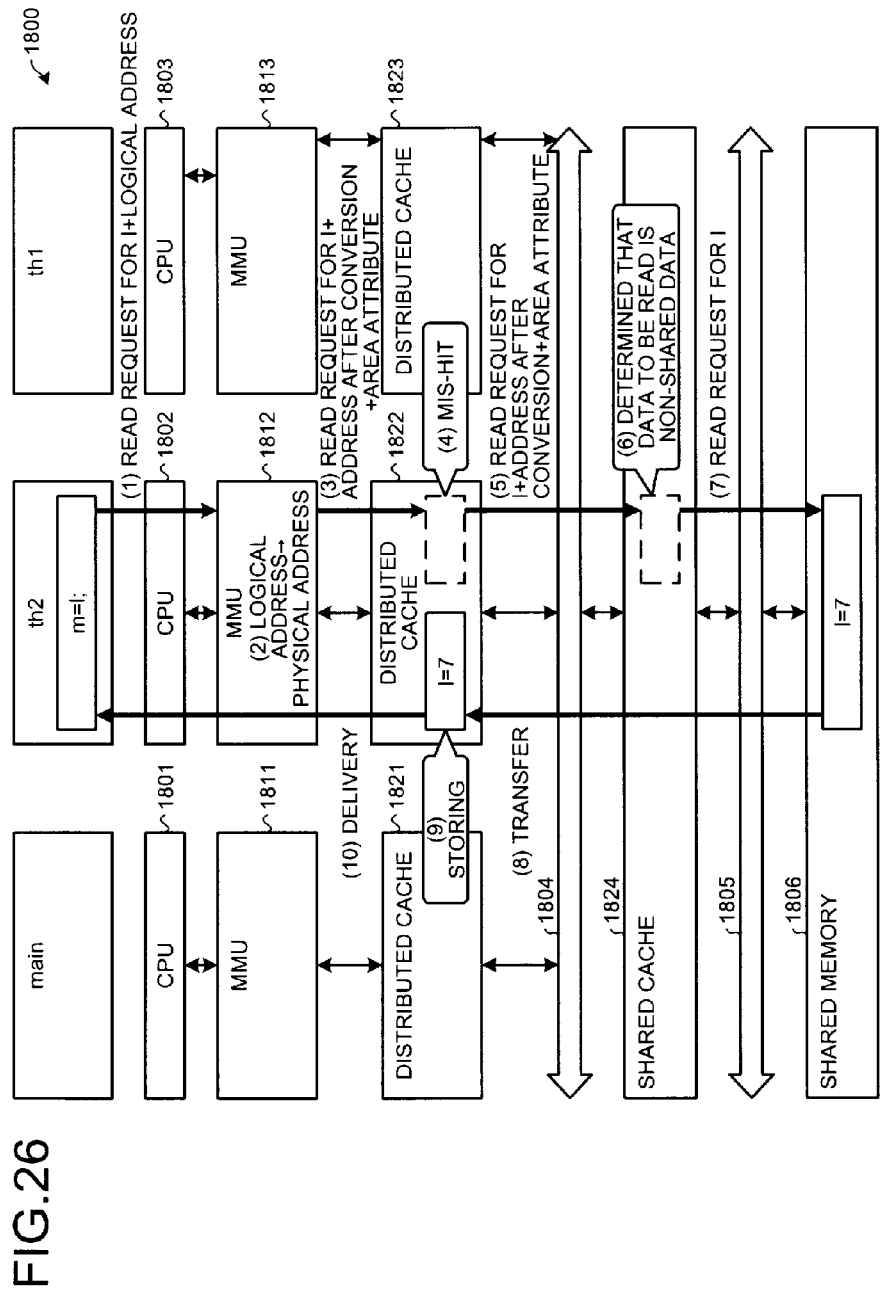
FIG. 26 is an explanatory diagram of an example where non-shared data is read from the shared memory 1806.

FIG. 26 is an explanatory diagram of an example where non-shared data is read from the shared memory 1806. In FIG. 26, the program 200 is currently executed; the thread "main" is assigned to the CPU 1801; the thread th2 is assigned to the CPU 1802; and the thread th1 is assigned to the CPU 1803. The OS 1852 currently executes "m=I:" of the thread th2 and executes reading of the value of the variable I to execute substitution of the value of the variable I for the variable m. The OS 1852 (1) notifies the MMU 1812 of the read request for the variable I with which the logical address of the variable I is correlated.

When the MMU 1812 receives the read request for the variable I, the MMU 1812 (2) converts the logical address of the variable I received into a physical address based on the conversion table 2300. The MMU 1812 extracts the area attribute from the conversion table 2300 based on the logical address of the variable I. The MMU 1812 correlates the address of the variable I after the conversion and the area attribute extracted with the read request for the variable I, and notifies the distributed cache 1822 of the read request for the variable I correlated therewith.

When the distributed cache controller 1832 receives the read request for the variable I, the distributed cache controller 1832 (4) determines whether the variable I is stored in the distributed cache memory 1842, based on the address after the conversion received. At this time, the distributed cache controller 1832 (4) determines a MIS-HIT. The distributed cache controller 1832 (5) correlates the address after the conversion and the area attribute with the read request for the variable I, and notifies the shared cache 1824 of the read request for the variable I correlated therewith.

When the shared cache controller 1834 receives the read request for the variable I, the shared cache controller 1834 (6) determines whether the variable I is shared data, based on the area attribute received. At this time, the shared cache controller 1834 determines that the variable I is non-shared data. It is assumed in the second embodiment that the shared cache memory 1842 does not store therein any non-shared data. Therefore, the shared cache controller 1834 determines a MIS-HIT.

The shared cache controller 1834 (7) notifies the shared memory 1806 of the read request for the variable I with which the address after the conversion is correlated and thereby, reads the variable I from the shared memory 1806.

Because the variable I is non-shared data, the shared cache controller 1834 (8) does not store therein the variable I read into the shared cache memory 1844 and transfers the variable I read into the distributed cache 1822. The distributed cache controller 1832 (9) stores the variable I in the distributed cache memory 1842.

The distributed cache controller 1832 (10) delivers the variable I read, to the thread th2 that is currently executed. "m=I" is executed.

Figure 27:
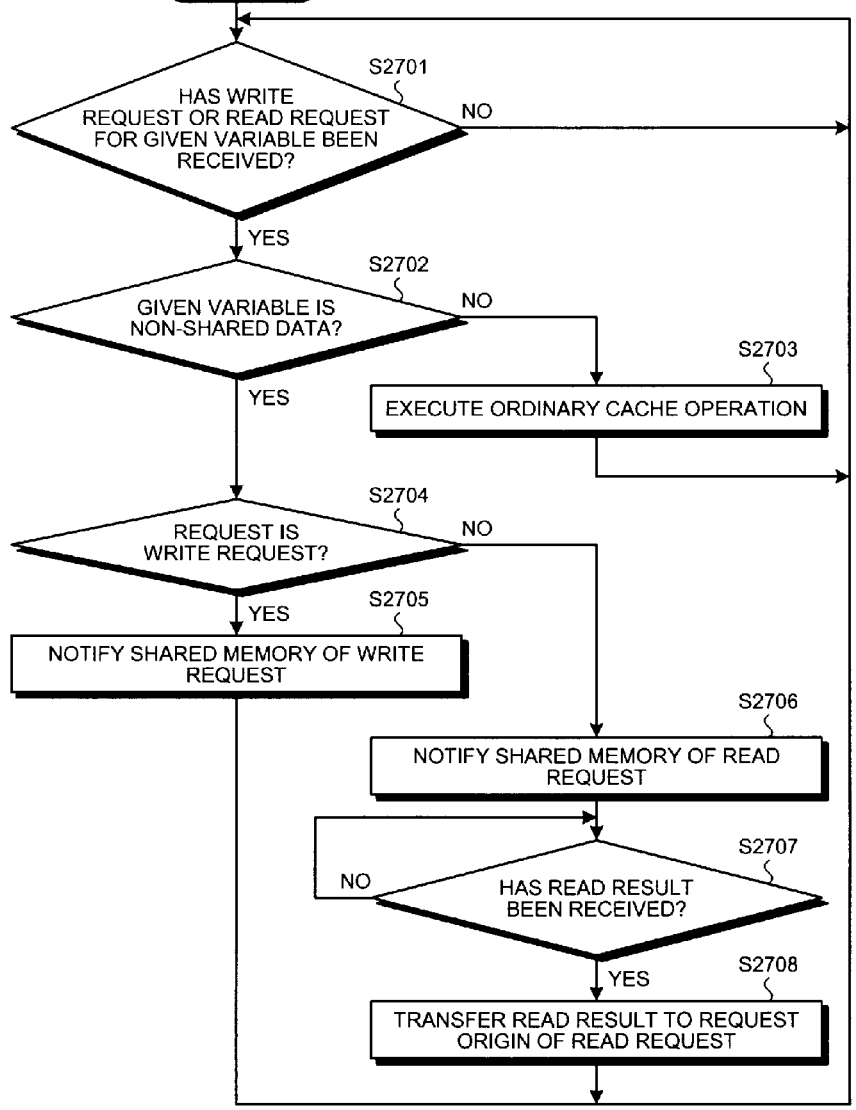
FIG. 27 is a flowchart of a control process procedure executed by the shared cache controller 1834 according to the second embodiment.

FIG. 27 is a flowchart of a control process procedure executed by the shared cache controller 1834 according to the second embodiment. The shared cache controller 1834 first determines whether the shared cache controller 1834 has received a write request or a read request for a given variable to be used (step S2701). If the shared cache controller 1834 determines that the shared cache controller 1834 has not received a write request or a read request for the given variable (step S2701: NO), the procedure returns to step S2701.

On the other hand, if the shared cache controller 1834 determines that the shared cache controller 1834 has received a write request or a read request for the given variable (step S2701: YES), the shared cache controller 1834 determines whether the given variable is non-shared data (step S2702). In this case, it is assumed that the area information is correlated with each of the read request and the write request.

If the shared cache controller 1834 determines that the given variable is not non-shared data (step S2702: NO), the shared cache controller 1834 executes the ordinary cache operation (step S2703) and the procedure returns to step S2701.

On the other hand, if the shared cache controller 1834 determines that the given variable is non-shared data (step S2702: YES), the shared cache controller 1834 determines whether the request is the write request (step S2704). If the shared cache controller 1834 determines that the request is the write request (step S2704: YES), the shared cache controller 1834 does not write the write request into the shared cache memory 1844 and notifies the shared memory 1806 of the write request for the given variable (step S2705) and the procedure returns to step S2701.

On the other hand, if the shared cache controller 1834 determines that the request is not the write request (step S2704: NO), the shared cache controller 1834 notifies the shared memory 1806 of the read request for the given variable (step S2706) and the shared cache controller 1834 determines whether the shared cache controller 1834 has received a read result (step S2707). If the shared cache controller 1834 determines that the shared cache controller 1834 has not received a read result (step S2707: NO), the procedure returns to step S2707.

On the other hand, if the shared cache controller 1834 determines that the shared cache controller 1834 has received a read result (step S2707: YES), the shared cache controller 1834 transfers the read result to the distributed cache controller that is the request origin of the read request (step S2708) and the procedure returns to step S2701.

In the third embodiment, an example where, in the case where the shared cache memory 1844 receives a write request though the shared cache memory 1844 has no empty area, when non-shared data and shared data are stored in the shared cache memory 1844, overwriting is executed on the non-shared data will be described.

In the third embodiment, it is assumed that the size of each data stored in the shared cache memory 1844 and the size of the data to be read are same. The hardware described in the third embodiment and that of the multi-core processor system 1800 described in the second embodiment are same and therefore, the components thereof are given the same reference numerals and will not again be described.

Figure 28:
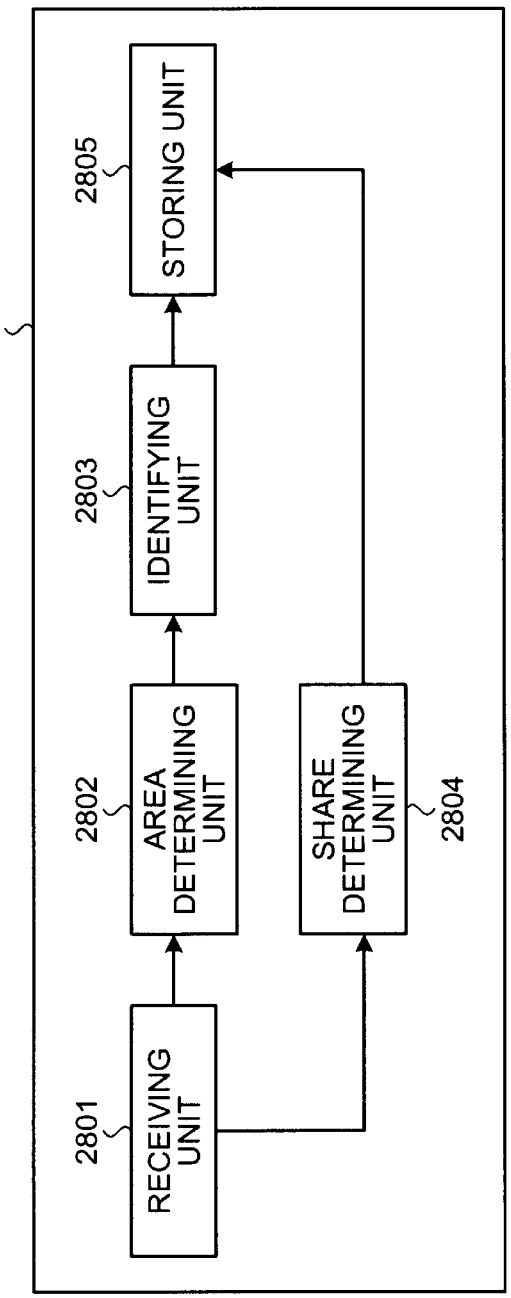
FIG. 28 is a functional block diagram of the shared cache controller 1834 according to a third embodiment.

FIG. 28 is a functional block diagram of the shared cache controller 1834 according to the third embodiment. The shared cache controller 1834 includes, for example, a receiving unit 2801, an area determining unit 2802, an identifying unit 2803, a share determining unit 2804, and a storing unit 2805.

For example, functions of these units are each defined by HDL description; elements such as a logical circuit, etc., are combined by logically coupling the HDL descriptions; and thereby, these units can be realized in the shared cache controller 1834. For example, these units may be stored as control programs in the shared memory 1806; and the shared cache controller 1834 having a function capable of executing programs like each of the CPUs may load the control programs and execute processes coded in the control programs.

The receiving unit 2801 receives a write request to write into the shared cache memory 1844 concerning the data to be read that includes identification information indicating whether the data to be read is non-shared data to be referred to by only one thread or shared data to be referred to by plural threads.

When the receiving unit 2801 receives the write request, the area determining unit 2802 determines whether any empty area capable of storing therein the data to be read is present in the shared cache memory 1844.

If the area determining unit 2802 determines that no empty area is present in the shared cache memory 1844, the identifying unit 2803 identifies non-shared data from data stored in the memory based on the identification information retained by each of the data.

The storing unit 2805 stores the data to an area for non-shared data identified by the identifying unit 2803.

When the receiving unit 2801 receives the write request, the share determining unit 2804 determines whether the data to be read is shared data or non-shared data, based on the identification information retained by the data to be read.

If the share determining unit 2804 determines that the data to be read is non-shared data, the storing unit 2805 does not store therein the data to be read and stores the data to a memory whose access speed is lower than that of the shared cache memory 1844 (in the third embodiment, the shared memory 1806).

An example will be described based on the above.

Figure 29:
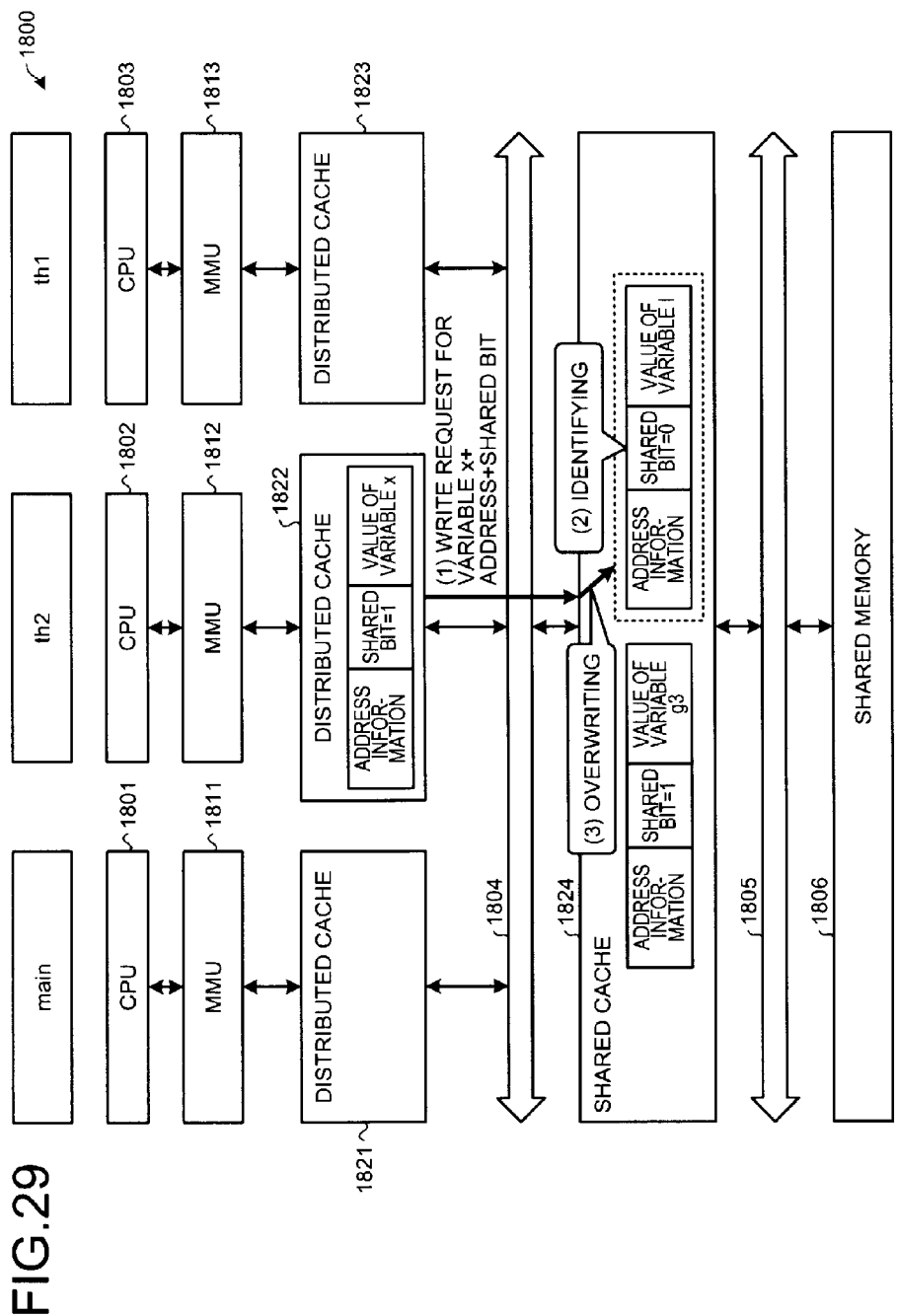
FIG. 29 is an explanatory diagram of an example where overwriting is executed on non-shared data.

FIG. 29 is an explanatory diagram of an example where overwriting is executed on non-shared data. The distributed cache controller 1832 first (1) notifies the shared cache 1824 of a write request for a variable "x" with which the physical address of the variable x and a shared bit are correlated. FIG. 29 does not depict the area information but depicts only the shared bit. When the shared cache controller 1834 receives the write request for the variable x, the shared cache controller 1834 determines whether the shared cache memory 1844 retains any empty area capable of storing the variable x. In this case, it is assumed that the shared cache controller 1834 determines that the shared cache memory 1844 retains no empty area.

The shared cache controller 1834 (2) identifies non-shared data based on the shared bit of the data stored in the shared cache memory 1844 and, at this time, the variable I is identified. The shared cache controller 1834 (3) overwrites the variable x on the area of the identified variable I. The address information and the shared bit of the variable X are overwritten on the address information and the shared bit of the variable I. In this case, an example is taken of the write-through scheme as the update scheme of the data and therefore, the variable I is overwritten on the variable x. However, when the write-back scheme is employed as the update scheme of data, the variable I may be removed to the shared memory 1806 before the overwriting of the variable x.

Figure 30:
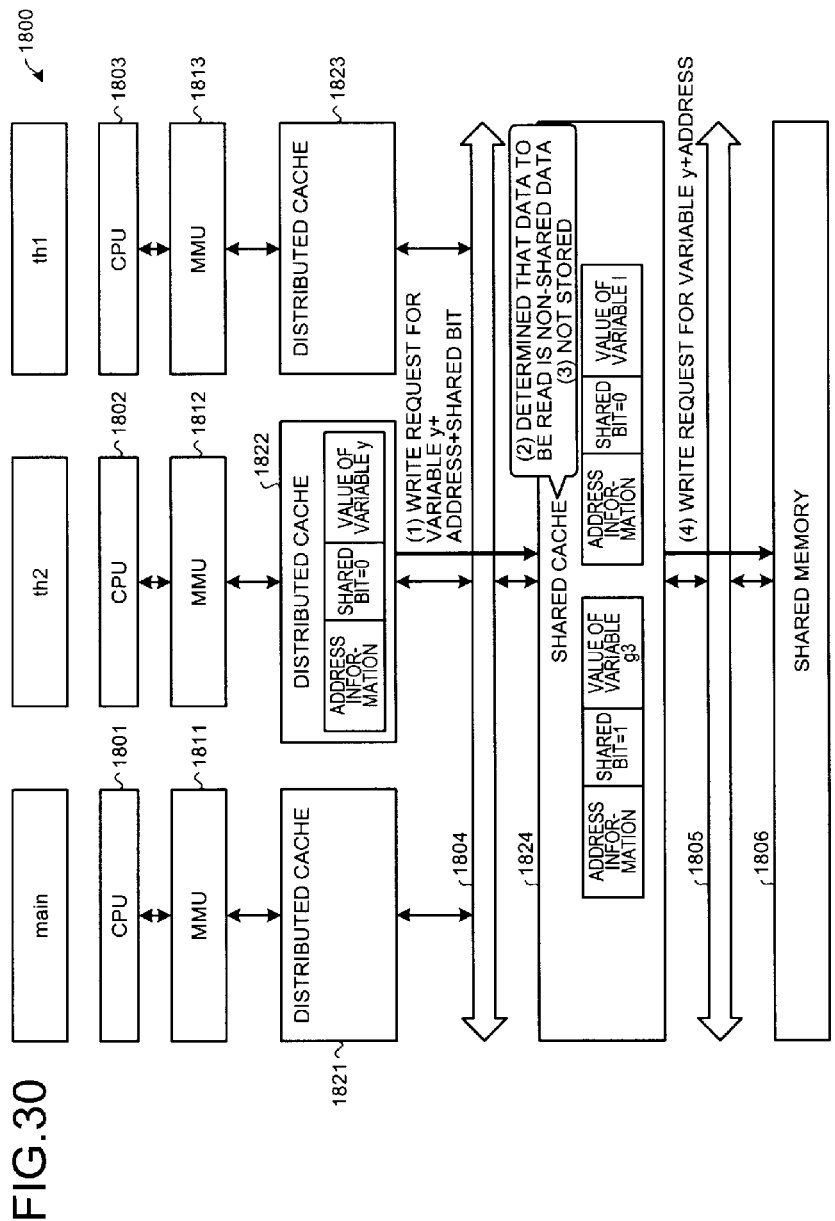
FIG. 30 is an explanatory diagram of an example where data to be read is non-shared data.

FIG. 30 is an explanatory diagram of an example where the data to be read is non-shared data. The distributed cache controller 1832 first (1) notifies the shared cache 1824 of a write request for a variable y with which the physical address and the shared bit of the variable y are correlated. In FIG. 30, the area information is not depicted and only the shared bit is described. When the shared cache controller 1834 receives the write request for the variable y, the shared cache controller 1834 determines whether an empty area capable of storing the variable y is present in the shared cache memory 1844. At this time, the shared cache controller 1834 determines that no empty area is present.

The shared cache controller 1834 (2) determines whether the variable y is shared data or non-shared data, based on the shared bit received. Because the shared bit is "0", the shared cache controller 1834 determines that the variable y is non-shared data. The shared cache controller 1834 (3) does not store the variable y to the shared cache memory 1844 and (4) notifies the shared memory 1806 of the write request for the variable y with which the address is correlated and thereby, writes the variable y into the shared memory 1806.

When the shared cache controller 1834 determines that no empty area is present, the shared cache controller 1834 determines whether the data to be read is shared data or non-shared data. However, regardless of the presence or absence of the empty area, when the data to be read is non-shared data, the data may not be stored in the shared cache memory 1844 but may be stored in the shared memory 1806.

FIG. 31 is a flowchart of a first example of a control process procedure executed by the shared cache controller 1834 according to the third embodiment. The shared cache controller 1834 first determines whether the shared cache controller 1834 has received a write request for the data to be read (step S3101). If the shared cache controller 1834 determines that the shared cache controller 1834 has not received a the write request for the data to be read (step S3101: NO), the procedure returns to step S3101.

On the other hand, if the shared cache controller 1834 determines that the shared cache controller 1834 has received the write request for the data to be read (step S3101: YES), the shared cache controller 1834 determines whether an empty area capable of storing the data to be read is present in the shared cache memory 1844 (step S3102). If the shared cache controller 1834 determines that an empty area capable of storing therein the data to be read is present in the shared cache memory 1844 (step S3102: YES), the shared cache controller 1834 stores the data to the empty area of the shared cache memory 1844 (step S3103).

If the shared cache controller 1834 determines that no empty area capable of storing the data is present in the shared cache memory 1844 (step S3102: NO), the shared cache controller 1834 identifies non-shared data based on the area information (shared bit) of the tag information that corresponds to the data, from the data stored in the shared cache memory 1844 (step S3104). The shared cache controller 1834 determines whether the non-shared data has been identified (step S3105). If the shared cache controller 1834 determines that non-shared data has not been identified (step S3105: NO), the shared cache controller 1834 selects an arbitrary data from the data stored in the shared cache memory 1844 (step S3106).

On the other hand, if the shared cache controller 1834 determines that non-shared data has been identified (step S3105: YES), the shared cache controller 1834 selects a data from among the identified data (step S3107). At this time, it is assumed that the size of the data stored in the shared cache memory 1844 and the size of the data to be read are same. Following step S3106 or S3107, the shared cache controller 1834 stores the data to the area for the selected data (step S3108) and the procedure returns to step S3102.

FIG. 32 is a flowchart of a second example of the control process procedure executed by the shared cache controller 1834 according to the third embodiment. The shared cache controller 1834 first determines whether the shared cache controller 1834 has received a write request for the data to be read (step S3201). If the shared cache controller 1834 determines that the shared cache controller 1834 has not received a write request for the data to be read (step S3201: NO), the procedure returns to step S3201.

On the other hand, if the shared cache controller 1834 determines that the shared cache controller 1834 has received a write request for the data to be read (step S3201: YES), the shared cache controller 1834 determines whether an empty area capable of storing the data to be read is present in the shared cache 1824 (step S3202). If the shared cache controller 1834 determines that an area capable of storing the data to be read is present in the shared cache 1824 (step S3202: YES), the shared cache controller 1834 stores the data to the empty area of the shared cache memory 1844 (step S3203).

On the other hand, if the shared cache controller 1834 determines that no empty area capable of storing the data to be read is present in the shared cache 1824 (step S3202: NO), the shared cache controller 1834 determines whether the data to be read is shared data (step S3204). If the shared cache controller 1834 determines that the data to be read is not shared data (step S3204: NO), the shared cache controller 1834 does not store the data to be read in the shared cache memory 1844 and writes the data into the shared memory 1806 (step S3205) and the procedure returns to step S3202.

On the other hand, if the shared cache controller 1834 determines that the data to be read is shared data (step S3204: YES), the shared cache controller 1834 identifies from the data stored in the shared cache memory 1844, non-shared data based on the area information (shared bit) of the tag information that corresponds to the data (step S3206).

The shared cache controller 1834 determines whether that the shared cache controller 1834 identifies the non-shared data (step S3207). If the shared cache controller 1834 determines that the shared cache controller 1834 does not identify the non-shared data (step S3207: NO), the shared cache controller 1834 selects arbitrary data from the shared cache memory 1844 (step S3208).

On the other hand, if the shared cache controller 1834 determines that the shared cache controller 1834 identifies the non-shred data (step S3207: YES), the shared cache controller 1834 selects one data from the identified data (step S3209). Following step S3208 or S3209, the shared cache controller 1834 stores the data to the area of the selected data (step S3210) and the procedure returns to step S3202.

As described, according to the multi-core processor system, the control program, and the control method, the data to be read is read from the shared memory. If the data to be read is non-shared data, the data that is read is not stored in the shared cache memory and is transferred to the shared cache memory of the request origin. If the data to be read is non-shared data that is referred to by only one thread, only the CPU to which the thread is assigned accesses the non-shared data and the other CPUs do not access the non-shared data. Therefore, the non-shared data not used by plural CPUs is not stored in the shared cache memory, and the shared data used by plural CPUs can be stored in the shared cache memory. Therefore, the area of the shared cache memory can effectively be used.

As described, according to the multi-core processor system, the control program, and the control method, in the case where a write request is issued for the data to be read, when no empty area is present in the shared cache memory, non-shared data is identified from the data stored in the shared cache memory. The data to be read is stored to the area of the identified non-shared data. Therefore, the shared data to be used by plural CPUs can be retained by the shared cache memory preferentially and the area of the shared cache memory can be used effectively.

In a case where a write request is issued for the data to be read, if the data to be read is non-shared data, the data is not stored to the shared cache memory and is stored to the shared memory and thereby, the shared data can be stored to the shared cache memory preferentially. Thereby, the competition to acquire the area of the shared cache memory can be suppressed by reducing the data to be stored in the shared cache memory.

The multi-core processor system, the control program, and the control method enable an area of the shared cache memory to be effectively be utilized by not causing the shared cache memory to store therein data that is not used by plural CPUs; and further enable the area of the shared cache memory to be effectively be utilized by causing the shared cache memory to retain preferentially the data that is used by the plural CPUs.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising:
    a plurality of cores;
    a shared cache memory shared by the cores;
    a control circuit that controls access to the shared cache memory; and
    a shared memory shared by the cores and having a lower access speed than the shared cache memory, wherein the control circuit:
    receives a write request to write to the shared cache memory, given data that includes identification information indicating whether the given data is non-shared data that is referred to by only one thread or shared data that is referred to by a plurality of threads;
    determines, when the write request is received, whether an empty area capable of storing the given data is present in the shared cache memory;
    determines, when an empty area is determined to not be present, whether the given data is the shared data or the non-shared data based on the identification information of the given data;
    identifies, when the given data is determined to be the shared data, non-shared data from among data stored in the shared cache memory based on the identification information of the data, and stores the given data to an area where the identified non-shared data is stored; and
    stores the given data to the shared memory when the given data is determined to be the non-shared data, without storing the given data to the shared cache memory.

2. A non-transitory computer-readable recording medium storing a program that causes a control circuit that controls access to a shared cache memory shared by cores of a multi-core processor, to execute a control process comprising:
    receiving a write request to write to the shared cache memory, given data that includes identification information indicating whether the given data is non-shared data that is referred to by only one thread or shared data that is referred to by a plurality of threads;
    determining, when the write request is received, whether an empty area capable of storing the given data is present in the shared cache memory;
    determining, when an empty area is determined to not be present in the shared cache memory, whether the given data is the shared data or the non-shared data based on the identification information of the given data;
    identifying, when the given data is determined to be the shared data, non-shared data from among data stored in the shared cache memory based on the identification information of the data, and storing the given data to an area where the identified non-shared data is stored; and
    storing, when the given data is determined to be the non-shared data, the given data to a shared memory shared by the cores of the multi-core processor and having a lower access speed than the shared cache memory, without storing the given data to the shared cache memory.

3. A control method executed by a control circuit that controls access to a shared cache memory shared by cores of a multi-core processor, the control method comprising:
    receiving a write request to write to the shared cache memory, given data that includes identification information indicating whether the given data is non-shared data that is referred to by only one thread or shared data that is referred to by a plurality of threads;
    determining, when the write request is received, whether an empty area capable of storing the given data is present in the shared cache memory;
    determining, when an empty area is determined to not be present in the shared cache memory, whether the given data is the shared data or the non-shared data based on the identification information of the given data;
    identifying, when the given data is determined to be the shared data, non-shared data from among data stored in the shared cache memory based on the identification information of the data, and storing the given data to an area where the identified non-shared data is stored; and
    storing, when the given data is determined to be the non-shared data, the given data to a shared memory shared by the cores of the multi-core processor and having a lower access speed than the shared cache memory, without storing the given data to the shared cache memory.

* * * * *